(12) United States Patent
Tajima et al.

(10) Patent No.: US 8,663,841 B2
(45) Date of Patent: Mar. 4, 2014

(54) POWER STORAGE DEVICE

(75) Inventors: Ryota Tajima, Kanagawa (JP); Takeshi Osada, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/613,013

(22) Filed: Sep. 13, 2012

(65) Prior Publication Data

US 2013/0071751 A1    Mar. 21, 2013

(30) Foreign Application Priority Data

Sep. 16, 2011   (JP) ................................. 2011-203688

(51) Int. Cl.
 *H01M 4/36* (2006.01)
 *H01M 4/66* (2006.01)

(52) U.S. Cl.
 USPC ...................... 429/218.1; 429/231.8; 429/245

(58) Field of Classification Search
 None
 See application file for complete search history.

(56) References Cited

U.S. PATENT DOCUMENTS

| | | | |
|---|---|---|---|
| 7,179,561 B2 | 2/2007 | Niu et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 2008/0254296 A1 | 10/2008 | Honda et al. | |
| 2010/0143798 A1 | 6/2010 | Zhamu et al. | |
| 2010/0176337 A1 | 7/2010 | Zhamu et al. | |
| 2010/0203391 A1* | 8/2010 | Lopatin et al. ............. | 429/231.8 |
| 2010/0209784 A1 | 8/2010 | Yamazaki et al. | |
| 2010/0216026 A1* | 8/2010 | Lopatin et al. ................ | 429/246 |
| 2010/0227228 A1 | 9/2010 | Yamazaki et al. | |
| 2010/0248034 A1 | 9/2010 | Kazuo et al. | |

(Continued)

FOREIGN PATENT DOCUMENTS

| | | |
|---|---|---|
| EP | 2 287 946 A1 | 2/2011 |
| JP | 2001-283834 | 10/2001 |

(Continued)

OTHER PUBLICATIONS

Zhou.X et al., "Graphene modified LiFePO4 cathode materials for high power lithium ion batteries ,", J. Mater. Chem. (Journal of Materials Chemistry), 2011, vol. 21, pp. 3353-3358.

(Continued)

*Primary Examiner* — John S Maples
(74) *Attorney, Agent, or Firm* — Nixon Peabody LLP; Jeffrey L. Costellia

(57) ABSTRACT

A power storage device in which charge capacity and discharge capacity are high and deterioration in battery characteristics due to charge/discharge is small is provided. A power storage device in which charge capacity and discharge capacity are high and output characteristics are excellent is provided. A power storage device in which charge capacity and discharge capacity are high and cycle characteristics are excellent is provided. A power storage device includes a negative electrode. The negative electrode includes a current collector, an active material including a plurality of protrusions protruding from the current collector and an outer shell in contact with and attached to surfaces of the plurality of protrusions, and graphene in contact with and attached to the outer shell. Axes of the plurality of protrusions are oriented in the same direction. A common portion may be provided between the current collector and the plurality of protrusions.

15 Claims, 11 Drawing Sheets

(56) References Cited

U.S. PATENT DOCUMENTS

| | | |
|---|---|---|
| 2010/0330421 A1 | 12/2010 | Cui et al. |
| 2011/0012067 A1 | 1/2011 | Kay |
| 2011/0020706 A1 | 1/2011 | Nesper |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2012/0045692 A1 | 2/2012 | Takemura et al. |
| 2012/0088151 A1 | 4/2012 | Yamazaki et al. |
| 2012/0088156 A1 | 4/2012 | Nomoto et al. |
| 2013/0071739 A1 | 3/2013 | Tajima et al. |
| 2013/0071762 A1 | 3/2013 | Tajima et al. |
| 2013/0084495 A1 | 4/2013 | Tajima et al. |

FOREIGN PATENT DOCUMENTS

| | | |
|---|---|---|
| JP | 2006-265751 | 10/2006 |
| JP | 2009-524567 | 7/2009 |
| JP | 2009-176721 | 8/2009 |
| JP | 2010-219030 | 9/2010 |
| JP | 2010-219392 | 9/2010 |
| JP | 2010-239122 | 10/2010 |
| JP | 2011-503804 | 1/2011 |
| JP | 2011-029184 | 2/2011 |
| JP | 2011-517053 | 5/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

* cited by examiner

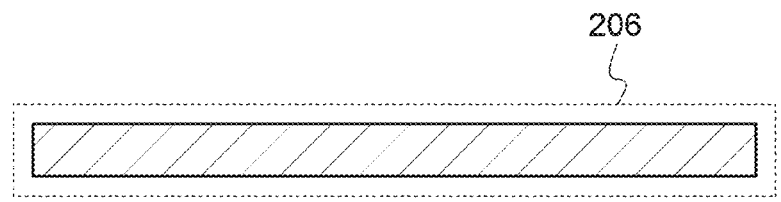
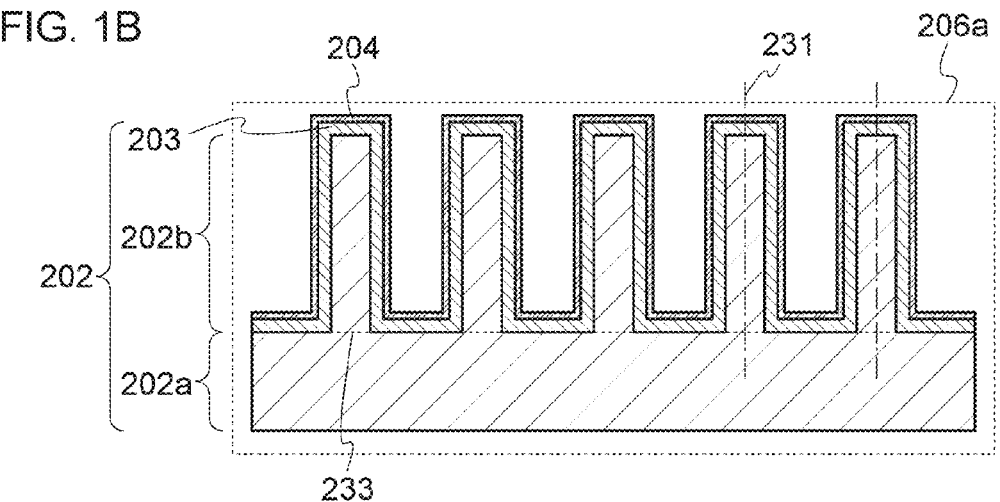
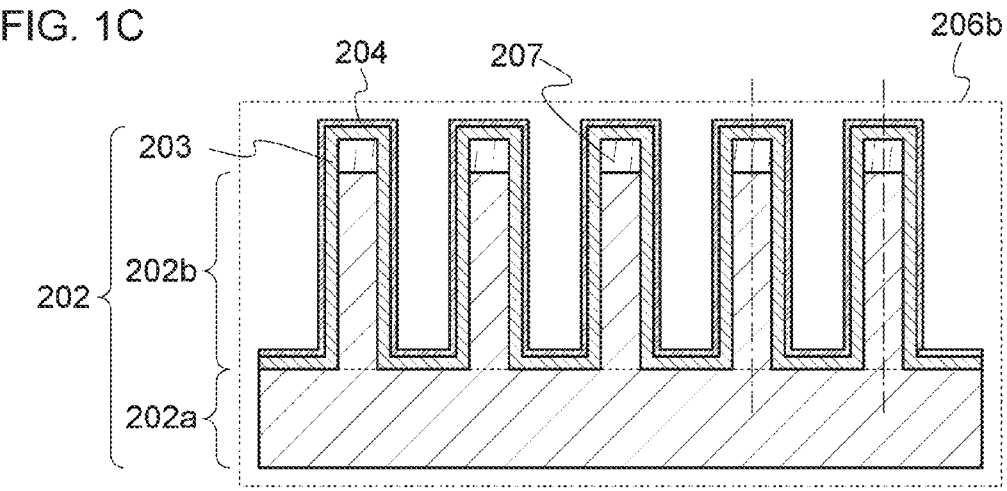

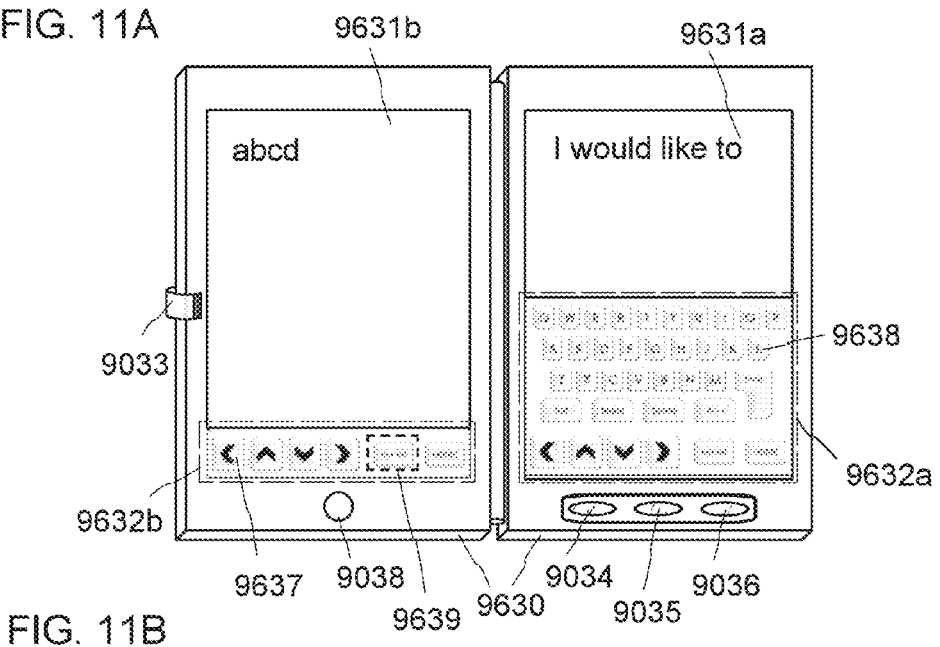
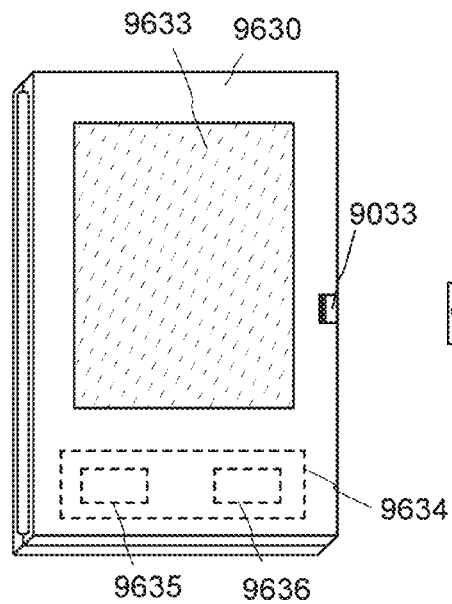
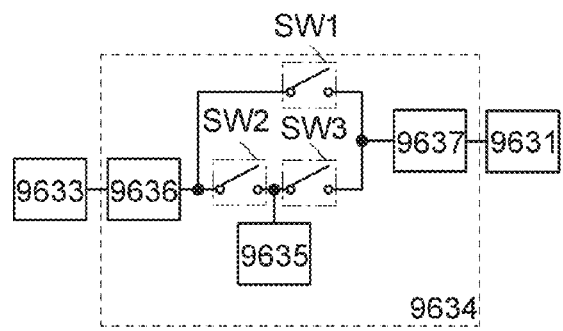

POWER STORAGE DEVICE

BACKGROUND OF THE INVENTION

1. Field of the Invention

The present invention relates to a power storage device and a method for manufacturing the power storage device.

2. Description of the Related Art

In recent years, power storage devices such as lithium-ion secondary batteries, lithium-ion capacitors, and air cells have been developed.

An electrode for the power storage device is manufactured by providing an active material over a surface of a current collector. As a negative electrode active material, a material which can occlude and release ions functioning as carriers (hereinafter referred to as carrier ions), such as carbon or silicon, is used. For example, silicon or phosphorus-doped silicon can occlude about four times as many carrier ions as carbon, and thus has higher theoretical capacity than carbon and is advantageous in increasing the capacity of the power storage device.

However, when the amount of carrier ions which are occluded is increased, the volume of an active material greatly changes in accordance with occlusion and release of carrier ions in charge/discharge cycle, resulting in problems such as lower adhesion between a current collector and a silicon layer and deterioration in battery characteristics due to charge/discharge. Accordingly, a layer formed using silicon is formed over a current collector and a layer formed using graphite is formed over the layer formed using silicon, thereby reducing deterioration in battery characteristics due to expansion and contraction of the layer formed using silicon (see Patent Document 1).

Silicon has lower conductivity than graphite; thus, by covering surfaces of silicon particles with graphite and forming an active material layer including the silicon particles over a current collector, the resistivity of the active material layer is reduced in manufacture of a negative electrode.

In recent years, the use of graphene as a conductive electronic material in semiconductor devices has been studied.

Graphene is chemically stable and has favorable electric characteristics and thus has been expected to be applied to channel regions of transistors, vias, wirings, and the like included in the semiconductor devices. Particles of an active material are covered with graphite or graphene in order to increase the conductivity of a material for an electrode in a lithium-ion battery (see Patent Document 2).

Further, in a power storage device, a positive electrode and a negative electrode are each provided with a plurality of protrusions so as to increase the capacity; in such a power storage device, a top portion of each of the plurality of protrusions of the positive electrode and the negative electrode is provided with an insulator in order to reduce pressure applied to a separator between the electrodes when the electrodes expand owing to charge/discharge (see Patent Documents 3 to 5).

REFERENCE

Patent Document

[Patent Document 1] Japanese Published Patent Application No. 2001-283834
[Patent Document 2] Japanese Published Patent Application No. 2011-029184
[Patent Document 3] Japanese Published Patent Application No. 2010-219030
[Patent Document 4] Japanese Published Patent Application No. 2010-239122
[Patent Document 5] Japanese Published Patent Application No. 2010-219392

SUMMARY OF THE INVENTION

When a silicon layer provided over a current collector is covered with a graphite layer, since the thickness of the graphite layer is large, e.g., a submicron scale to a micron scale, the amount of carrier ions transferred between an electrolyte and the silicon layer is reduced. In addition, in an active material layer including silicon particles covered with graphite, the amount of silicon contained in the active material layer is reduced. Consequently, the amount of reaction between silicon and carrier ions is reduced, which causes a reduction in charge/discharge capacity and makes it difficult to perform charge/discharge at high speed in a power storage device.

Even when particles of an active material are covered with graphite, it has been difficult to suppress expansion and contraction of the particles of the active material owing to repeating charge/discharge and to suppress pulverization of the particles of the active material owing to the expansion and the contraction. In this specification, for example, pulverization means breakup of the active material due to expansion and contraction.

In view of the above, an embodiment of the present invention provides a power storage device in which charge capacity and discharge capacity are high and deterioration in battery characteristics due to charge/discharge is small. In addition, an embodiment of the present invention provides a power storage device in which charge capacity and discharge capacity are high and output characteristics are excellent. Furthermore, an embodiment of the present invention provides a power storage device in which charge capacity and discharge capacity are high and cycle characteristics are excellent.

An embodiment of the present invention is a power storage device including a negative electrode. The negative electrode includes a common portion, a plurality of protrusions protruding from the common portion, an outer shell in contact with and attached to surfaces of the common portion and the plurality of protrusions, and graphene in contact with and attached to a surface of the outer shell. Axes of the plurality of protrusions are oriented in the same direction.

An embodiment of the present invention is a power storage device including a negative electrode. The negative electrode includes a current collector, a plurality of protrusions provided over the current collector, an outer shell in contact with and attached to surfaces of the current collector and the plurality of protrusions, and graphene in contact with and attached to a surface of the outer shell. Axes of the plurality of protrusions are oriented in the same direction. A common portion may be provided between the current collector and the plurality of protrusions.

An embodiment of the present invention is a power storage device including a negative electrode. The negative electrode includes a common portion, a plurality of protrusions protruding from the common portion, an outer shell in contact with and attached to surfaces of the common portion and the plurality of protrusions, and graphene in contact with and attached to a surface of the outer shell. The plurality of protrusions have translation symmetry when viewed from the above.

An embodiment of the present invention is a power storage device including a negative electrode. The negative electrode includes a current collector, a plurality of protrusions provided over the current collector, an outer shell in contact with and attached to surfaces of the current collector and the plurality of protrusions, and graphene in contact with and attached to a surface of the outer shell. The plurality of protrusions have translation symmetry when viewed from the above. A common portion may be provided between the current collector and the plurality of protrusions.

In the electrode, the common portion means a region which covers an entire surface of the current collector and is formed using a material similar to that of the plurality of protrusions. Further, an axis of each of the plurality of protrusions means a straight line which passes the top of the protrusion (or the center of a top surface of the protrusion) and the center of a bottom surface of the protrusion which is in contact with the common portion or the current collector. That is, the axis is a straight line which passes the center of the longitudinal direction of the protrusion. The number of the protrusions corresponds to the number of the straight lines. When the axes of the plurality of protrusions are oriented in the same direction, the straight lines are substantially parallel with each other. Specifically, the angle between the straight lines is less than or equal to 10 degrees, preferably less than or equal to 5 degrees. As described above, the plurality of protrusions are structures which are formed by etching and different from whisker-like structures which extend in various directions.

The common portion, the plurality of protrusions, and the outer shell are formed using silicon. Alternatively, the common portion, the plurality of protrusions, and the outer shell may be formed using silicon to which an impurity imparting conductivity type such as phosphorus or boron is added.

The common portion and the plurality of protrusions have a single crystal structure, a polycrystalline structure, or a microcrystalline structure, and the outer shell has an amorphous structure. In addition, the common portion and the plurality of protrusions may have different crystalline structures from each other. Moreover, the common portion and the plurality of protrusions may have a crystalline structure obtained by combining a plurality of crystalline structures selected from a single crystal structure, a polycrystalline structure, and a microcrystalline structure. An active material having a single crystal structure, a polycrystalline structure, or a microcrystalline structure is likely to be pulverized owing to expansion and contraction through charge/discharge reaction. However, in an amorphous structure, density of constituent elements is low compared to a single crystal structure, a polycrystalline structure, or a microcrystalline structure, so that the pulverization due to expansion and contraction through charge/discharge reaction is unlikely to be caused. Accordingly, with the use of an active material whose outer shell has an amorphous structure, influence of expansion and contraction through charge/discharge reaction can be reduced; as a result, a negative electrode in which an active material is unlikely to be pulverized can be manufactured. Using such a negative electrode allows a power storage device in which charge capacity and discharge capacity are high and cycle characteristics are excellent to be manufactured.

In this specification, graphene refers to a sheet of carbon molecules with a thickness of one atomic layer having double bonds (also referred to as $sp^2$ bonds). Graphene includes, in its category, single-layer graphene which is a sheet of carbon molecules having a thickness corresponding to one atomic layer as described above and multilayer graphene in which a plurality of single-layer graphenes are stacked. Graphene may contain oxygen at a concentration of higher than or equal to 2 at. % and lower than or equal to 11 at. %, preferably higher than or equal to 3 at. % and lower than or equal to 10 at. %. Note that graphene to which an alkali metal such as potassium is added may also be used.

An embodiment of the present invention is a method for manufacturing an electrode, including the steps of forming a mask over a silicon substrate, etching part of the silicon substrate to form a common portion and a plurality of protrusions protruding from the common portion, forming an amorphous silicon layer over the common portion and the plurality of protrusions, and forming graphene over the amorphous silicon layer.

An embodiment of the present invention is a method for manufacturing a negative electrode, including the steps of forming a silicon layer over a current collector, forming a mask over the silicon layer, etching part of the silicon layer to form a plurality of protrusions over the current collector, forming an amorphous silicon layer over the plurality of protrusions, and forming graphene over the amorphous silicon layer. Note that part of the silicon layer formed over the current collector may be etched such that a common portion covering an entire top surface of the current collector is formed and the plurality of protrusions protrude from the common portion.

An active material of a negative electrode includes a common portion and a plurality of protrusions which protrude from the common portion. Axes of the plurality of protrusions are oriented in the same direction and the protrusions protrude in the direction perpendicular to the common portion, so that the density of the protrusions in the negative electrode can be increased and the surface area of the active material can be increased. Accordingly, using the negative electrode according to an embodiment of the present invention allows a power storage device in which charge capacity and discharge capacity are high and output characteristics are excellent to be manufactured.

In an active material of a negative electrode, a space is provided between a plurality of protrusions. Further, graphene covers the active material. Thus, even when the active material expands in charge reaction, contact between the protrusions can be suppressed and the graphene can prevent the active material from being broken due to charge/discharge. The plurality of protrusions have translation symmetry and formed with high uniformity in the negative electrode, so that local reaction can be reduced in each of the positive electrode and the negative electrode, and carrier ions and the active material react with each other uniformly between the positive electrode and the negative electrode. Accordingly, using the negative electrode according to an embodiment of the present invention allows a power storage device in which charge capacity and discharge capacity are high and cycle characteristics are excellent to be manufactured. In this specification, "being broken" means that for example, an active material is pulverized and separated from a current collector.

When a surface of an active material is in contact with an electrolyte in a power storage device, the electrolyte and the active material react with each other, so that a film is formed on the surface of the active material. The film is called a solid electrolyte interface (SEI) and considered necessary for relieving reaction between the active material and the electrolyte and for stabilization. However, when the thickness of the film is increased, carrier ions are less likely to be occluded in the active material of the negative electrode, leading to problems such as a reduction in conductivity of carrier ions between the active material and the electrolyte. Graphene covering the active material can suppress an increase in thickness of the film, so that a decrease in conductivity of carrier ions can be suppressed. Accordingly, using the negative electrode according to an embodiment of the present invention allows a power storage device in which charge capacity and discharge capacity are high and deterioration in battery characteristics due to charge/discharge is small to be manufactured.

Silicon has lower electric conductivity than carbon, and the electric conductivity is further reduced when silicon becomes amorphous due to charge/discharge. Thus, a negative electrode in which silicon is used as an active material has high resistivity. However, since graphene has high conductivity, by covering silicon with graphene, electrons can transfer at sufficiently high speed in graphene. In addition, graphene has a thin sheet-like shape; by covering a plurality of protrusions with graphene, the amount of silicon in the active material layer can be increased and carrier ions can transfer more easily than in the case of using graphite. As a result, the conductivity of carrier ions can be increased, reaction between silicon that is the active material and carrier ions can be increased, and carrier ions can be easily occluded by the active material. Accordingly, using the negative electrode according to an embodiment of the present invention allows a power storage device in which charge capacity and discharge capacity are high and output characteristics are excellent to be manufactured.

In accordance with an embodiment of the present invention, a power storage device in which charge capacity and discharge capacity are high and deterioration due to charge/discharge is small can be provided. In addition, a power storage device in which charge capacity and discharge capacity are high and output characteristics are excellent can be provided. Further, by using the above-described electrode, a power storage device in which cycle characteristics are excellent can be provided.

BRIEF DESCRIPTION OF THE DRAWINGS

FIGS. 1A to 1C each illustrate a negative electrode.
FIGS. 11A to 11C illustrate an electronic device.

DETAILED DESCRIPTION OF THE INVENTION

Figure 2A:
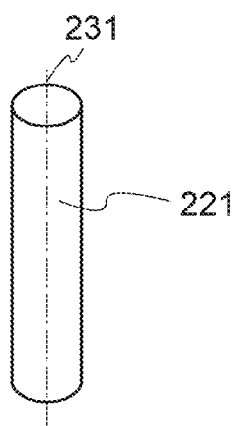
FIGS. 2A to 2D each illustrate a shape of a protrusion included in a negative electrode.
Figure 2B:
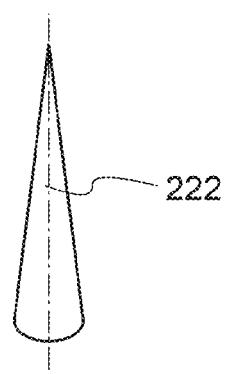
Figure 2C:
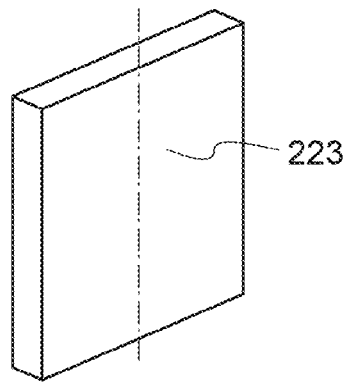
Figure 2D:
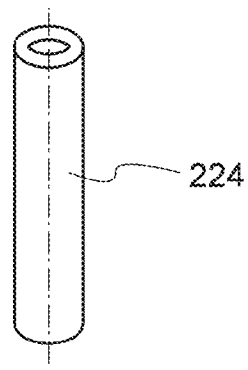

Hereinafter, embodiments will be described with reference to the drawings. However, the embodiments can be implemented with many different modes. It will be readily appreciated by those skilled in the art that modes and details thereof can be modified in various ways without departing from the spirit and the scope of the present invention. Thus, the present invention should not be interpreted as being limited to the following description of the embodiments.

Embodiment 1

In this embodiment, a structure of a negative electrode of a power storage device which is less deteriorated through charge/discharge and has excellent cycle characteristics and a manufacturing method thereof will be described with reference to FIGS. 1A to 1C, FIGS. 2A to 2D, FIGS. 3A to 3D, and FIGS. 4A to 4C.

FIG. 1A is a cross-sectional view of a negative electrode 206 according to an embodiment of the present invention. The negative electrode 206 functions as an active material.

Note that the active material refers to a material that relates to occlusion and release of carrier ions. An active material layer contains, in addition to the active material, one or more of a conductive additive, a binder, graphene, and the like. Thus, the active material and the active material layer are distinguished from each other.

A secondary battery in which lithium ions are used as carrier ions is referred to as a lithium-ion secondary battery. In addition, as examples of carrier ions which can be used instead of lithium ions, alkali-metal ions such as sodium ions and potassium ions; alkaline-earth metal ions such as calcium ions, strontium ions, and barium ions; beryllium ions; magnesium ions; and the like are given.

A specific structure of the negative electrode 206 will be described with reference to FIGS. 1B and 1C. Typical examples of the negative electrode 206 are a negative electrode 206a and a negative electrode 206b in FIGS. 1B and 1C, respectively.

FIG. 1B is an enlarged cross-sectional view of the negative electrode 206a. The negative electrode 206a includes an active material 202 and graphene 204 which is in contact with and attached to a surface of the active material 202. The active material 202 includes a common portion 202a, a plurality of protrusions 202b which protrude from the common portion 202a, and an outer shell 203 which is in contact with and attached to surfaces of the common portion 202a and the plurality of protrusions 202b. The outer shell 203 has an amorphous structure.

As the active material 202, one or more of silicon, germanium, tin, aluminum, and the like, which can occlude and release carrier ions, is used. Silicon which has high theoretical capacity is preferably used as the active material 202. Alternatively, silicon to which an impurity element imparting one conductivity type, such as phosphorus or boron, is added may be used. Silicon to which the impurity element imparting one conductivity type, such as phosphorus or boron, is added has higher conductivity, so that the conductivity of the negative electrode can be increased. Accordingly, charge capacity and discharge capacity can be improved as compared to a power storage device including a negative electrode in which silicon to which the impurity element imparting one conductivity type is not added is used as the active material 202.

With the use of silicon as a negative electrode active material as described above, the theoretical capacity can be higher than in the case where graphite is used as the active material; thus, a power storage device can be downsized while keeping the capacity.

The common portion 202a serves as a base layer of the plurality of protrusions 202b. The common portion 202a is a continuous layer and is contact with the plurality of protrusions 202b.

The protrusion 202b can be any of the following as appropriate: a columnar protrusion 221 having a cylindrical shape (see FIG. 2A) or a prismatic shape, a conical or pyramidal protrusion 222 having a conical shape (see FIG. 2B) or a pyramidal shape, a plate-like protrusion 223 (see FIG. 2C), a pipe-like protrusion 224 (see FIG. 2D), and the like. Note that the top or the edge of the protrusion 202b may be curved. In FIG. 1B, a cylindrical protrusion is used as the protrusion 202b.

A top view of the electrode in this embodiment will be described with reference to FIGS. 3A to 3D. Note that in FIGS. 3A to 3D, the outer shell 203 and the graphene 204 are not illustrated for simplicity.

Figure 3A:
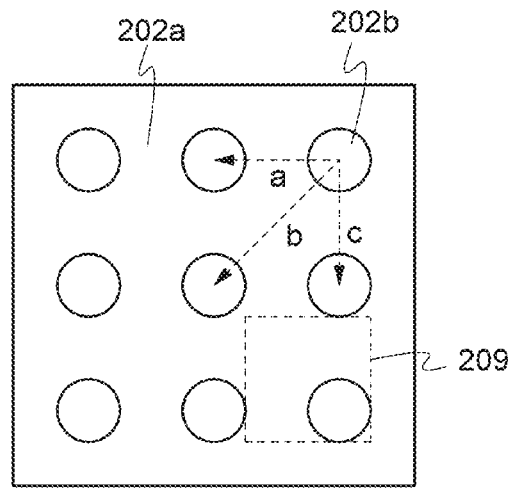
FIGS. 3A to 3D each illustrate a negative electrode.
Figure 3B:
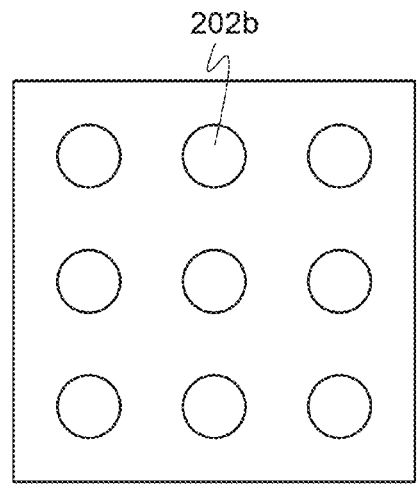

FIG. 3A is a top view illustrating the common portion 202a and the plurality of protrusions 202b which protrude from the common portion 202a. The plurality of protrusions 202b which have circular top shapes are arranged. FIG. 3B is a top view after movement of the plurality of protrusions 202b in FIG. 3A in the direction a. In FIGS. 3A and 3B, the plurality of protrusions 202b are provided at the same positions. That is, the plurality of protrusions 202b illustrated in FIG. 3A have translation symmetry. Here, the plurality of protrusions 202b in FIG. 3A move in the direction a; however, the same result as FIG. 3B can be obtained after movement in the direction b or c.

The proportion of the protrusion 202b in the unit of symmetry which is denoted by a dashed line 209 is preferably higher than or equal to 25% and lower than or equal to 60%. That is, the proportion of a space (a region without the protrusion) in the unit of symmetry is preferably higher than or equal to 40% and lower than or equal to 75%. When the proportion of the protrusion 202b in the unit of symmetry is higher than or equal to 25%, the theoretical charge/discharge capacity of the negative electrode can be higher than or equal to about 1000 mAh/g. In addition, by setting the proportion of the protrusion 202b in the unit of symmetry to lower than or equal to 60%, also when the charge/discharge capacity is maximum (i.e., theoretical capacity) and the protrusions expand, the adjacent protrusions are not in contact with each other, and even when the active material expands due to charge/discharge, the protrusions can be prevented from being broken. As a result, high charge/discharge capacity can be achieved, the adjacent protrusions are not in contact with each other, and deterioration of the negative electrode due to charge/discharge can be reduced.

Figure 3C:
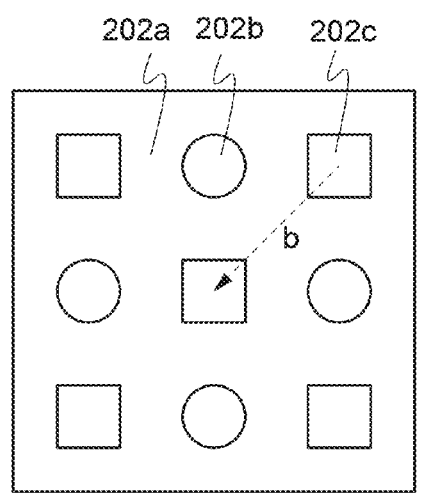
Figure 3D:
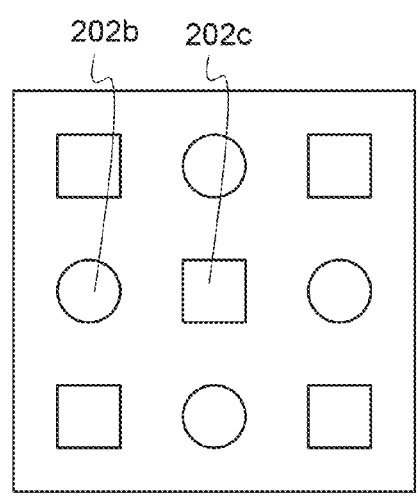

FIG. 3C is a top view illustrating the common portion 202a and a plurality of protrusions which protrude from the common portion 202a. The protrusion 202b which has a circular top shape and a protrusion 202c which has a square top shape are alternately arranged. FIG. 3D is a top view after movement of the plurality of protrusions 202b and 202c in the direction b. In the top views of FIGS. 3C and 3D, the plurality of protrusions 202b and 202c are provided at the same positions. That is, the plurality of protrusions 202b and 202c illustrated in FIG. 3C have translation symmetry.

By providing the plurality of protrusions such that they have translation symmetry, variation in electron conductivity among the plurality of protrusions in the negative electrode can be reduced. Accordingly, local reaction in the negative electrode can be reduced, reaction between carrier ions and the active material can occur uniformly, and diffusion overvoltage (concentration overvoltage) can be prevented, so that the reliability of battery characteristics can be increased.

The common portion 202a and the plurality of protrusions 202b can have a single crystal structure, a polycrystalline structure, or a microcrystalline structure as appropriate. The common portion 202a and the plurality of protrusions 202b may have the same kind of crystalline structure or different kinds of crystalline structures. For example, the common portion 202a and the plurality of protrusions 202b may both have a single crystal structure. Alternatively, the common portion 202a may have a single crystal structure and the plurality of protrusions 202b may have a polycrystalline structure. Moreover, the common portion 202a and the plurality of protrusions 202b may have a crystalline structure obtained by combining a plurality of structures selected from a single crystal structure, a polycrystalline structure, and a microcrystalline structure.

The interface between the common portion 202a and the plurality of protrusions 202b is not clear. Accordingly, in the active material 202, a plane including the deepest depression among depressions between the plurality of protrusions 202b and parallel with a plane where the protrusions 202b are formed is defined as an interface 233 between the common portion 202a and the plurality of protrusions 202b.

In the plurality of protrusions 202b, straight lines (axes 231) each of which passes the top of the protrusion (or the center of a top surface of the protrusion) and extends in the direction in which the protrusion protrudes are oriented in the same direction. Specifically, the directions of the axes 231 are substantially parallel with each other, and the angle between the axes 231 is less than or equal to 10 degrees, preferably less than or equal to 5 degrees. Note that the axis 231 is a straight line which passes the top of the protrusion (or the center of a top surface of the protrusion) and the center of a bottom surface of the protrusion which is in contact with the common portion. That is, the axis is a straight line which passes the center of the longitudinal direction of the protrusion. The direction of the axis 231 can be referred to as a direction in which the protrusion 202b extends from the common portion 202a. That is, in the active material 202, the longitudinal directions of the plurality of protrusions 202b are the same. A cross-sectional shape parallel with the longitudinal direction is referred to as a longitudinal cross-sectional shape. In addition, a cross-sectional shape of a plane substantially perpendicular to the longitudinal direction of the protrusion 202b is referred to as a lateral cross-sectional shape.

Further, preferably, the plurality of protrusions 202b have substantially the same shapes. With such a structure, the volume (or the weight) of the active material which is needed for a desired capacity of the electrode can be easily estimated, and the volume of the active material can be easily controlled.

The height of the protrusion 202b is five times to hundred times, preferably ten times to fifty times, the width of the protrusion, typically, greater than or equal to 0.5 μm and less than or equal to 100 μm, preferably greater than or equal to 1 μm and less than or equal to 50 μm. With the height of the protrusion 202b being greater than or equal to 0.5 μm, the charge/discharge capacity can be increased. With the height of the protrusion 202b being less than or equal to 100 μm, even when the plurality of protrusions expand in charge and discharge, the protrusions can be prevented from being pulverized. The height of the protrusion 202b is a distance from the top (or the center of the top surface) of the protrusion 202b to the interface 233 in the direction of the straight line (the axis) in a longitudinal cross-sectional shape.

In a cross-sectional shape (a lateral cross-sectional shape) substantially perpendicular to the longitudinal direction of the protrusions 202b, the width of each protrusion is greater than or equal to 0.1 μm and less than or equal to 1 μm, preferably greater than or equal to 0.2 μm and less than or equal to 0.5 μm. With the width of the protrusion 202b being greater than or equal to 0.1 μm, the charge/discharge capacity can be increased. With the width of the protrusion 202b being less than or equal to 1 μm, even when the plurality of protrusions expand or contract in charge and discharge, the protrusions can be prevented from being pulverized.

In the case where silicon is used as the active material 202 in the power storage device including the negative electrode according to an embodiment of the present invention, the volume of the active material 202 increases about two times due to charge reaction in which carrier ions are inserted. Thus, the plurality of protrusions 202b (including the outer shell 203 and the graphene 204) are provided over the common portion 202a with a predetermined distance therebetween. For example, the distance between the plurality of protrusions 202b is preferably 1.29 times to 2 times the width of the protrusion 202b. In such a manner, even when the active material 202 expands in charge reaction, the protrusions 202b can be prevented from being in contact with each other. Consequently, pulverization of the active material 202 due to charge/discharge can be suppressed, which allows a power storage device in which deterioration in battery characteristics due to charge/discharge is small to be manufactured.

In the active material 202, the outer shell 203 having an amorphous structure is in contact with and attached to surfaces of the common portion 202a and the plurality of protrusions 202b. For example, in the active material 202, the proportion of the volume of the outer shell 203 having an amorphous structure (with respect to the volume of the active material 202) is preferably greater than or equal to 5% and less than or equal to 50%. Specifically, when the protrusion 202b is the cylindrical protrusion 221 in FIG. 2A, the distance from a surface of the protrusion 202b to a surface of the outer shell 203 (the thickness of the outer shell 203) is preferably 0.025 times to 0.3 times the distance from the axis 231 to the surface of the outer shell 203 (corresponding to the radius of the cylindrical protrusion 221). The outer shell 203 has lower conductivity than the common portion 202a and the plurality of protrusions 202b having a crystalline structure and thus is preferably provided as thin as possible so that the conductivity of the negative electrode 206a is not reduced.

When the outer shell 203 is in contact with and attached to surfaces of the common portion 202a and the plurality of protrusions 202b, the following advantages can be obtained.

Silicon having any of the above-mentioned crystalline structures has higher density of silicon elements than silicon having an amorphous structure. When silicon having a crystalline structure expands due to charge reaction, a crack is likely to be generated and the silicon is likely to be pulverized due to repeating charge/discharge. In particular, when the charge rate is increased in a power storage device including an electrode in which only silicon having a crystalline structure is used as an active material, charge reaction occurs rapidly when the potential exceeds a certain value and the active material rapidly expands, so that a crack is very likely to be generated in the active material. Furthermore, the active material is easily pulverized due to repeating charge/discharge.

Silicon having an amorphous structure has lower density of silicon elements than silicon having a crystalline structure. When silicon having an amorphous structure expands due to charge reaction, a crack is less likely to be generated and the silicon is less likely to be pulverized due to repeating charge/discharge. In addition, defect levels such as dangling bonds exist in silicon having an amorphous structure; thus, there are a plurality of reaction levels in the band gap of silicon having an amorphous structure. Thus, since a plurality of reaction levels exist in silicon having an amorphous structure, from a macroscopic aspect, it can be said that the charge reaction occurs in a wider range of potential than silicon having a crystalline structure. That is, since silicon having an amorphous structure gradually expands and does not rapidly expand, a crack is less likely to be generated and the silicon is less likely to be pulverized due to repeating charge/discharge.

When the outer shell 203 is in contact with and attached to surfaces of the common portion 202a and the plurality of protrusions 202b, influence of expansion and contraction due to charge/discharge reaction can be relieved. That is, even when the charge rate is increased in the power storage device including the electrode in which the active material 202 is used, generation of a crack in the active material 202 (in particular, the common portion 202a and the plurality of protrusions 202b) can be suppressed, and pulverization of the active material 202 due to repeating charge/discharge can be suppressed. Accordingly, using the negative electrode according to an embodiment of the present invention allows a power storage device in which charge capacity and discharge capacity are high and cycle characteristics are excellent to be manufactured.

The graphene 204 functions as a conductive additive. Alternatively, the graphene 204 may function as an active material; in such a case, the capacity of the power storage device including the negative electrode 206 can be increased.

The graphene 204 includes single-layer graphene and multilayer graphene in its category. The graphene 204 has a sheet-like shape with a length of several micrometers.

The single-layer graphene refers to a sheet of carbon molecules with a thickness of one atomic layer having $sp^2$ bonds. In the single-layer graphene, six-membered rings formed of carbon atoms are arranged in a plane direction. In part of the single-layer graphene, a poly-membered ring such as a seven-membered ring, an eight-membered ring, a nine-membered ring, or a ten-membered ring, is formed.

A poly-membered ring is composed of a carbon atom and an oxygen atom in some cases. Alternatively, an oxygen atom is bonded to one of carbon atoms in a poly-membered ring composed of the carbon atoms in some cases. In the case where graphene contains oxygen, such a poly-membered ring is formed when a carbon-carbon bond in part of a six-membered ring is broken and an oxygen atom is bonded to a carbon atom whose bond is broken. Accordingly, an opening functioning as a path through which ions can transfer is included in the bond between the carbon atom and the oxygen atom. That is, as the proportion of oxygen atoms included in graphene is higher, the proportion of openings each functioning as a path through which ions can transfer is increased.

When the graphene 204 contains oxygen, the proportion of oxygen is higher than or equal to 2 at. % and lower than or equal to 11 at. %, preferably higher than or equal to 3 at. % and lower than or equal to 10 at. %. As the proportion of oxygen becomes lower, the conductivity of the graphene can be higher. As the proportion of oxygen becomes higher, more openings serving as paths of ions can be formed in the graphene. Note that graphene to which an alkali metal such as potassium is added may also be used.

When the graphene 204 is multilayer graphene, the graphene 204 includes a plurality of single-layer graphenes, typically, two to hundred single-layer graphenes and thus is very thin. Since the single-layer graphene contains oxygen, the interlayer distance between the graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. General graphite includes single-layer graphenes whose interlayer distance is 0.34 nm. Since the interlayer distance of a plurality of single-layer graphenes in the graphene 204 is longer than that in general graphite, ions can easily transfer in a direction parallel with a surface of the single-layer graphene in the graphene 204. The graphene 204 contains oxygen and includes single-layer graphene or multilayer graphene in which a poly-membered ring is formed and thus includes openings in places. Thus, in the case where the graphene 204 is multilayer graphene, ions can transfer in the direction parallel with a surface of the single-layer graphene, i.e., through a gap between the single-layer graphenes, and in the direction perpendicular to a surface of the graphene, i.e., through an opening formed in each of the single-layer graphenes.

In addition, since the plurality of protrusions 202b protrude from the common portion 202a in the active material 202 of the negative electrode 206 including the negative electrode 206a and the negative electrode 206b, the active material 202 has a larger surface area than a plate-like active material. Axes of the plurality of protrusions 202b are oriented in the same direction and the protrusions 202b protrude in the direction perpendicular to the common portion 202a, so that the density of the protrusions in the negative electrode 206a and the negative electrode 206b can be efficiently increased and the surface area of the active material can be efficiently increased. A space is provided between the plurality of protrusions 202b. Further, the graphene 204 covers the active material 202. Thus, even when the active material 202 expands in charge reaction, contact between the protrusions can be suppressed. Moreover, even when the active material 202 is pulverized due to repeating charge/discharge reaction, the graphene 204 can prevent the active material 202 from being broken. Accordingly, using the negative electrode according to an embodiment of the present invention allows a power storage device in which output characteristics and cycle characteristics are excellent to be manufactured.

In the negative electrode according to an embodiment of the present invention, the plurality of protrusions have translation symmetry and formed with high uniformity, so that local reaction can be reduced in each of the positive electrode and the negative electrode, and carrier ions and the active material can react with each other uniformly between the positive electrode and the negative electrode. Consequently, in the case where the negative electrode according to an embodiment of the present invention is used to manufacture the power storage device, high-speed charge/discharge becomes possible, and pulverization and breakup of the active material due to charge/discharge can be suppressed, whereby a power storage device with improved cycle characteristics can be manufactured.

Furthermore, when the shapes of the protrusions of the negative electrode are substantially the same in the power storage device including the negative electrode according to an embodiment of the present invention, local charge/discharge can be reduced, and the volume (or the weight) of the active material can be controlled.

Furthermore, when the heights of the protrusions in the negative electrode are the same in the power storage device including the negative electrode according to an embodiment of the present invention, load can be prevented from being applied locally, so that the mechanical strength of the power storage device can be improved. In addition, a separator can be flatly provided between the negative electrode and the positive electrode, whereby defects such as short circuit between the negative electrode and the positive electrode can be reduced. Further, load can be prevented from being applied locally in the manufacturing process of the power storage device, which can increase the yield. When the heights of the protrusions in the negative electrode are the same, specifications of the battery can be well controlled.

When the surface of the active material is in contact with an electrolyte in the power storage device, the electrolyte and the active material react with each other, so that a film is formed on a surface of the electrode. The film is called a solid electrolyte interface (SEI) and considered necessary for relieving reaction between the electrode and the electrolyte and for stabilization. However, when the thickness of the film is increased, carrier ions are less likely to be occluded in the electrode (in particular, the active material), leading to problems such as a reduction in conductivity of carrier ions between the electrode and the electrolyte. Since the graphene 204 is in contact with and attached to the surface of the active material 202, contact between the active material 202 and the electrolyte can be prevented, so that an increase in thickness of the film can be suppressed and a decrease in conductivity of carrier ions can be suppressed. Accordingly, using the negative electrode according to an embodiment of the present invention allows a power storage device in which deterioration in battery characteristics due to charge/discharge is small to be manufactured.

Graphene has high electric conductivity; when the graphene 204 is in contact with and attached to the surface of the active material 202, electrons can transfer at a sufficiently high speed in the graphene 204. In addition, graphene has a thin sheet-like shape; by covering a plurality of protrusions with graphene, the amount of the active material 202 can be increased and carrier ions can transfer more easily than in graphite. As a result, the conductivity of carrier ions can be increased, reaction between silicon that is the active material 202 and carrier ions can be increased, and carrier ions can be easily occluded by the active material 202. Accordingly, using the negative electrode according to an embodiment of the present invention allows a power storage device in which charge/discharge can be performed at high speed to be manufactured.

Note that a silicon oxide layer may be provided between the active material 202 and the graphene 204. By providing the silicon oxide layer over the active material 202, carrier ions are inserted into silicon oxide in charging of the power storage device. As a result, a silicate compound, e.g., alkali metal silicate such as $Li_4SiO_4$, $Na_4SiO_4$, or $K_4SiO_4$, alkaline earth metal silicate such as $Ca_2SiO_4$, $Sr_2SiO_4$, or $Ba_2SiO_4$, $Be_2SiO_4$, $Mg_2SiO_4$, or the like is formed. Such a silicate compound can serve as a path through which carrier ions transfer. By providing the silicon oxide layer, influence of expansion of the active material 202 can be suppressed. Accordingly, pulverization of the active material 202 can be suppressed while the charge/discharge capacity is maintained. In discharging after charging, not all metal ions serving as carrier ions are released from the silicate compound formed in the silicon oxide layer and part of the metal ions remain, so that the silicon oxide layer is a mixture layer of silicon oxide and the silicate compound.

In addition, the thickness of the silicon oxide layer is preferably greater than or equal to 2 nm and less than or equal to 10 nm. With the thickness of the silicon oxide layer being greater than or equal to 2 nm, expansion of the active material 202 due to charge/discharge can be relieved. In addition, with the thickness of the silicon oxide layer being less than or equal to 10 nm, carrier ions can transfer easily, which can prevent a reduction in charge/discharge capacity. By providing the silicon oxide layer over the active material 202, pulverization of the active material 202 due to charge/discharge can be suppressed.

Like the negative electrode 206b illustrated in FIG. 1C, a protective layer 207 may be provided between the top of the protrusion 202b in the active material 202 and the graphene 204.

The protective layer 207 is formed to have a single-layer structure or a layered structure using one or more of a conductive layer, a semiconductor layer, and an insulating layer as appropriate. The thickness of the protective layer 207 is preferably greater than or equal to 100 nm and less than or equal to 10 μm. When the protective layer 207 is provided, since the protective layer 207 serves as a hard mask when the plurality of protrusions are formed by etching, variation in height among the plurality of protrusions 202b can be reduced. That is, the protective layer 207 is formed using a material whose etching rate is much lower than the etching rate of a material of one of or both the common portion 202a and the plurality of protrusions 202b. The etching rate also depends on the etching conditions (such as the kind of an etching gas and the flow rate of a gas); thus, the etching conditions are selected as appropriate.

Next, a method for manufacturing the negative electrode 206 will be described with reference to FIGS. 4A to 4C. Here, as one mode of the negative electrode 206, the negative electrode 206a illustrated in FIG. 1B will be described.

Figure 4A:
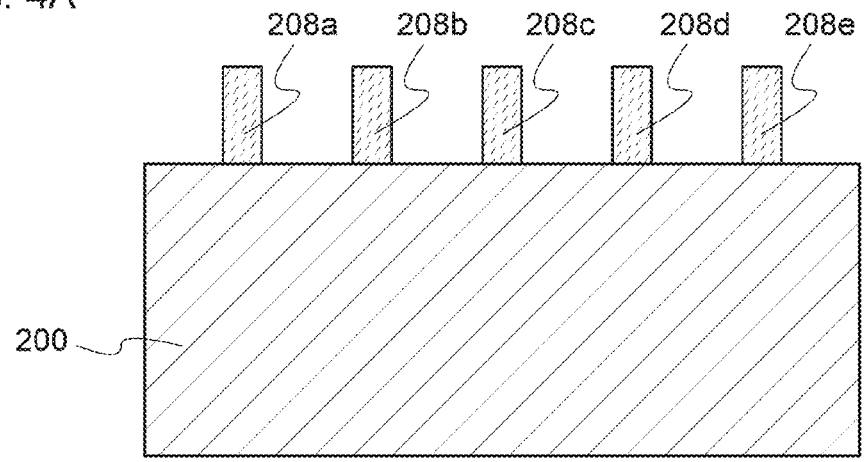
FIGS. 4A to 4C illustrate a method for manufacturing a negative electrode.

As illustrated in FIG. 4A, masks 208a to 208e are formed over a silicon substrate 200.

A single crystal silicon substrate or a polycrystalline silicon substrate is used as the silicon substrate 200. By using, as the silicon substrate, an n-type silicon substrate doped with phosphorus or a p-type silicon substrate doped with boron, an active material can be used as the negative electrode without providing the current collector.

The masks 208a to 208e can be formed by a photolithography step. Alternatively, the masks 208a to 208e can be formed by an inkjet method, a printing method, or the like.

Figure 4B:
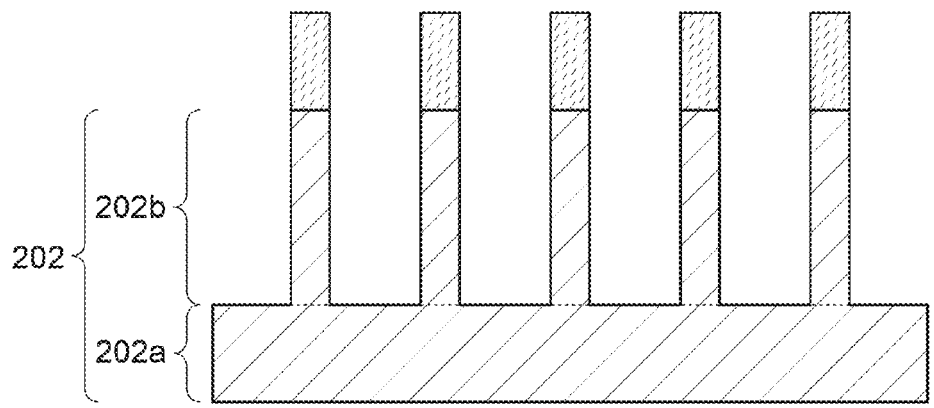

The silicon substrate 200 is selectively etched with the use of the masks 208a to 208e, so that the common portion 202a and the plurality of protrusions 202b are formed as illustrated in FIG. 4B. As a method for etching the silicon substrate, a dry etching method or a wet etching method can be used as appropriate. Note that when a Bosch process which is a deep etching method is used, a high protrusion can be formed.

For example, an n-type silicon substrate is etched with an inductively coupled plasma (ICP) apparatus by using, as an etching gas, chlorine, hydrogen bromide, and oxygen, whereby the active material 202 including the common portion 202a and the plurality of protrusions 202b can be formed. The etching time is adjusted such that the common portion 202a remains. The flow rate ratio of the etching gas may be adjusted as appropriate. For example, the flow rate ratio of chlorine, hydrogen bromide, and oxygen can be 10:15:3.

After the common portion 202a and the plurality of protrusions 202b are formed, the masks 208a to 208e are removed.

As described in this embodiment, the silicon substrate is etched with the use of the masks, whereby the plurality of protrusions 202b whose axes are oriented in the same direction can be formed. Further, the plurality of protrusions whose shapes are substantially the same can be formed. In this manner, the plurality of protrusions 202b are the same in height.

Next, the outer shell 203 is formed over the common portion 202a and the plurality of protrusions 202b. The outer shell 203 can be formed by a chemical vapor deposition (CVD) method typified by a plasma CVD method or a thermal CVD method, or a physical vapor deposition method typified by a sputtering method.

When the outer shell 203 is formed by a CVD method, since the common portion 202a and the plurality of protrusions 202b have a crystalline structure, silicon having an amorphous structure of the outer shell 203 might be epitaxially grown. Thus, it is preferable to form the outer shell 203 by lowering the temperature of a substrate as much as possible; in such a way, the outer shell 203 of silicon having an amorphous structure can be formed.

After the common portion 202a and the plurality of protrusions 202b are formed, surfaces thereof may be treated with plasma using a rare gas or the like, whereby the outer shell 203 of silicon having an amorphous structure can be formed.

Figure 4C:
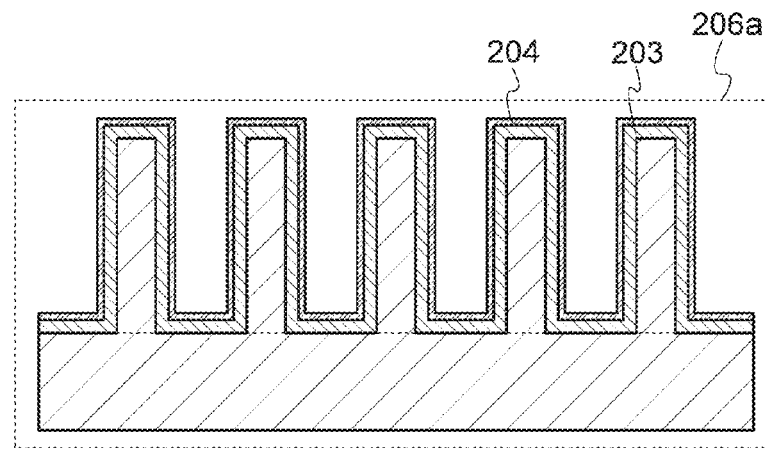

Next, the graphene 204 is formed over the active material 202, so that the negative electrode 206a can be formed as illustrated in FIG. 4C.

As a method for forming the graphene 204, there are a gas phase method and a liquid phase method. In the gas phase method, after forming, as a nucleus, nickel, iron, gold, copper, or an alloy containing such a metal over the active material 202, graphene is grown from the nucleus in an atmosphere containing hydrocarbon such as methane or acetylene. In the liquid phase method, graphene oxide is provided over the surface of the active material 202 using a dispersion liquid containing graphene oxide, and then, graphene oxide is reduced to form graphene.

The dispersion liquid containing graphene oxide is obtained by a method in which graphene oxide is dispersed in a solvent, a method in which after graphite is oxidized in a solvent, graphite oxide is separated into graphene oxide to form a dispersion liquid containing graphene oxide, and the like. In this embodiment, the graphene 204 is formed over the active material 202 by using the dispersion liquid containing graphene oxide which is formed by, after oxidizing graphite, separating graphite oxide into graphene oxide.

In this embodiment, graphene oxide is formed by an oxidation method called a Hummers method. A Hummers method is as follows: a sulfuric acid solution of potassium permanganate or the like is mixed into graphite powder to cause oxidation reaction; thus, a mixed solution containing graphite oxide is formed. Graphite oxide contains a functional group such as an epoxy group, a carbonyl group including a carboxyl group, or a hydroxyl group due to oxidation of carbon in graphite. Accordingly, the interlayer distance between adjacent graphenes of a plurality of graphenes in graphite oxide is longer than the interlayer distance in graphite. Then, ultrasonic vibration is transferred to the mixed solution containing graphite oxide, so that the graphite oxide whose interlayer distance is long can be cleaved to separate graphene oxide and to form a dispersion liquid containing graphene oxide. Note that a method for forming graphene oxide other than a Hummers method can be used as appropriate.

Graphene oxide includes an epoxy group, a carbonyl group including a carboxyl group, a hydroxyl group, or the like. In a solution having polarity, different graphene oxides are easily dispersed because these substituents have high polarity. Accordingly, in a liquid having polarity, graphene oxides are dispersed uniformly, and in a later step, graphene oxides can be provided uniformly over the surface of the outer shell 203.

As a method of soaking the active material 202 in the dispersion liquid containing graphene oxide to provide graphene oxide over the active material 202, a coating method, a spin coating method, a dipping method, a spray method, an electrophoresis method, or the like may be employed. Alternatively, these methods may be combined as appropriate to be employed.

As the plurality of protrusions 202b get higher, the dispersion liquid containing graphene oxide reaches a depression region between the plurality of protrusions 202b with difficulty, so that the graphene oxide cannot be provided uniformly and sufficiently. With the use of an electrophoresis method, ionized graphene oxide can be electrically transferred to the active material, whereby the graphene oxide can be provided also in the depression region uniformly and sufficiently. That is, with the use of an electrophoresis method, even when the plurality of protrusions are high, the graphene oxide can be provided uniformly and sufficiently over the surfaces of the common portion 202a and the plurality of protrusions 202b.

In a method for reducing graphene oxide provided over the active material 202, heating is performed at higher than or equal to 150° C., preferably higher than or equal to 200° C. and lower than or equal to the temperature which the active material 202 can withstand, in a vacuum, air, an atmosphere of an inert gas (nitrogen, a rare gas, or the like), or the like. By being heated at a higher temperature and for a longer time, graphene oxide is reduced to a higher extent so that graphene with high purity (i.e., with a low concentration of elements other than carbon) can be obtained. In addition, there is also a method in which graphene oxide is soaked in a reducing solution to be reduced.

Since graphite is treated with sulfuric acid according to a Hummers method, a sulfone group and the like are also bonded to graphene oxide, and its decomposition (release) is caused at higher than or equal to 200° C. and lower than or equal to 300° C., preferably higher than or equal to 200° C. and lower than or equal to 250° C. Thus, in a method for reducing graphite oxide by heating, graphene oxide is preferably reduced at higher than or equal to 200° C.

Through the reduction treatment, adjacent graphenes are bonded to each other to form a huge net-like or sheet-like shape. Further, through the reduction treatment, openings are formed in the graphenes due to the release of oxygen. Furthermore, the graphenes overlap with each other in parallel with a surface of a substrate. As a result, the graphene 204 in which carrier ions can transfer between layers and in openings is formed.

In accordance with this embodiment, the negative electrode 206a illustrated in FIG. 1B can be formed.

An insulating layer is formed over the silicon substrate 200, the masks 208a to 208e are formed over the insulating layer, and separated protective layers 207 are formed with the use of the masks 208a to 208e (see FIG. 1C). After that, with the use of the masks 208a to 208e and the separated protective layers 207, the silicon substrate 200 is selectively etched, whereby the negative electrode 206b illustrated in FIG. 1C can be formed. When the plurality of protrusions 202b are high, that is, the etching time is long, the masks are thinned gradually in the etching step and part of the masks are removed to expose the silicon substrate 200. Accordingly, there is variation in height among the protrusions. However, by using the separated protective layers 207 as hard masks, the silicon substrate 200 can be prevented from being exposed, so that variation in height among the protrusions can be reduced.

Note that in the negative electrode 206 including the negative electrode 206a and the negative electrode 206b, instead of the graphene 204, a film having higher conductivity than the active material 202, such as a nickel thin film, may be formed over the active material 202.

This embodiment can be implemented by being combined with other embodiments as appropriate.

Embodiment 2

In this embodiment, a negative electrode having a structure different from that of Embodiment 1 and a method for manufacturing the negative electrode will be described with reference to FIGS. 5A to 5D and FIGS. 6A to 6C. The negative electrode described in this embodiment is different from that of Embodiment 1 in that a current collector is provided.

Figure 5A:
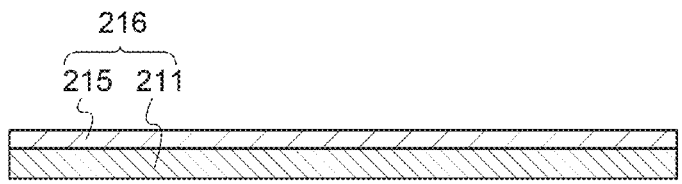
FIGS. 5A to 5D each illustrate a negative electrode.

FIG. 5A is a cross-sectional view of a negative electrode 216. In the negative electrode 216, an active material layer 215 is provided over a current collector 211.

A specific structure of the negative electrode 216 will be described with reference to FIGS. 5B to 5D. Typical examples of the active material layer 215 included in the negative electrode 216 are an active material layer 215a, an active material layer 215b, and an active material layer 215c in FIGS. 5B, 5C, and 5D, respectively.

Figure 5B:
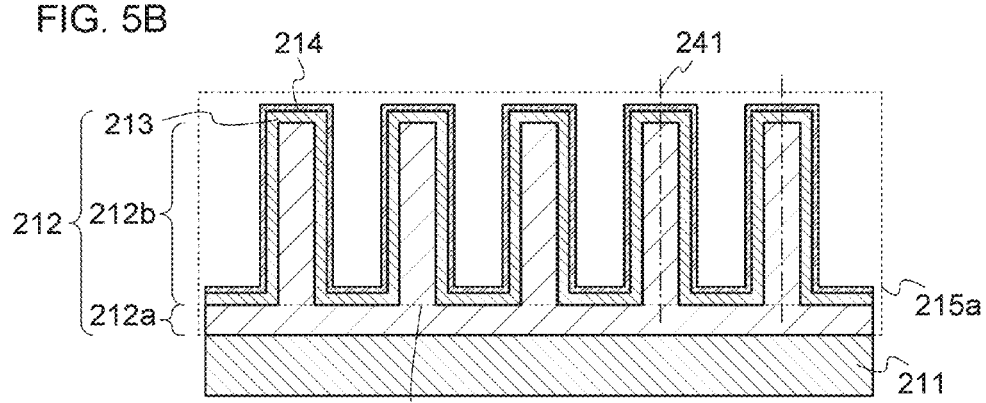

FIG. 5B is an enlarged cross-sectional view of the current collector 211 and the active material layer 215a. The active material layer 215a is provided over the current collector 211. The active material layer 215a includes an active material 212 and graphene 214 in contact with and attached to the surface of the active material 212. The active material 212 includes a common portion 212a, a plurality of protrusions 212b which protrude from the common portion 212a, and an outer shell 213 which is in contact with and attached to surfaces of the common portion 212a and the plurality of protrusions 212b. The outer shell 213 has an amorphous structure.

The interface between the common portion 212a and the plurality of protrusions 212b is not clear. Accordingly, in the active material 212, a plane including the deepest depression among depressions between the plurality of protrusions 212b and parallel with a plane where the protrusions 212b are formed is defined as an interface 243 between the common portion 212a and the plurality of protrusions 212b.

In addition, axes 241 of the plurality of protrusions 212b are oriented in the same direction. The axis 241 of the protrusion is a straight line which passes the top of the protrusion (or the center of a top surface of the protrusion) and the center of a bottom surface of the protrusion which is in contact with the common portion. That is, the axis is a straight line which passes the center of the longitudinal direction of the protrusion. The direction of the axis 241 is a direction in which the protrusion 212b extends from the common portion 212a. That is, in the active material 212, the longitudinal directions of the plurality of protrusions 212b are oriented in the same direction.

The current collector 211 can be formed using a highly conductive material such as a metal typified by stainless steel, gold, platinum, zinc, iron, aluminum, copper, or titanium, or an alloy thereof. Note that the current collector 211 is preferably formed using an aluminum alloy to which an element which improves heat resistance, such as silicon, titanium, neodymium, scandium, or molybdenum, is added. Alternatively, the current collector 211 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like.

The current collector 211 can have any of various shapes such as a foil-like shape, a plate-like shape (a sheet-like shape), a net-like shape, a punching-metal shape, an expanded-metal shape, and the like as appropriate.

The active material 212 can be formed using a material similar to that of the active material 202 in Embodiment 1 as appropriate.

The common portion 212a is a layer which serves as a base layer of the plurality of protrusions 212b and is continuous over the current collector 211, similarly to the common portion 202a in Embodiment 1. In addition, the common portion 212a and the plurality of protrusions 212b are in contact with each other.

The plurality of protrusions 212b can have the same shape as the plurality of protrusions 202b in Embodiment 1 as appropriate.

The common portion 212a and the plurality of protrusions 212b can have a single crystal structure, a polycrystalline structure, or a microcrystalline structure similarly to the plurality of protrusions 202b described in Embodiment 1. The common portion 212a and the plurality of protrusions 212b may have different kinds of crystalline structures. For example, the common portion 212a and the plurality of protrusions 212b may both have a single crystal structure. Alternatively, the common portion 212a may have a single crystal structure and the plurality of protrusions 212b may have a polycrystalline structure. Moreover, the common portion 212a and the plurality of protrusions 212b may have a crystalline structure obtained by combining a plurality of structures selected from a single crystal structure, a polycrystalline structure, and a microcrystalline structure.

The width or height of the protrusion 212b can be the same as the protrusion 202b in Embodiment 1.

The outer shell 213 has an amorphous structure like the outer shell 203 described in Embodiment 1.

As the graphene 214, graphene having a structure similar to that of the graphene 204 in Embodiment 1 can be used as appropriate.

Figure 5C:
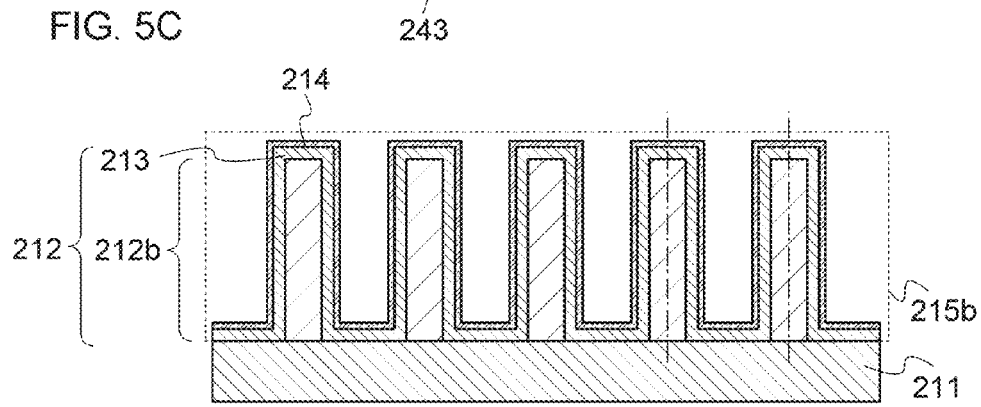

Like the active material layer 215b in FIG. 5C, the negative electrode 216 may have a structure in which the common portion is not provided, the plurality of protrusions 212b which are separated from each other are provided over the current collector 211, the outer shell 213 is formed over the current collector 211 and the plurality of protrusions 212b, and the graphene 214 is formed over the outer shell 213.

The graphene 214 is in contact with part of the current collector 211, so that electrons can flow easily in the graphene 214 and reaction between the carrier ions and the active material can be improved.

When the current collector 211 is formed using a metal material that forms silicide as described above, in the current collector 211, a silicide layer may be formed on the side in contact with the active material 212. In the case where a metal material that forms silicide is used to form the current collector 211, titanium silicide, zirconium silicide, hafnium silicide, vanadium silicide, niobium silicide, tantalum silicide, chromium silicide, molybdenum silicide, cobalt silicide, nickel silicide, or the like is formed as a silicide layer.

Figure 5D:
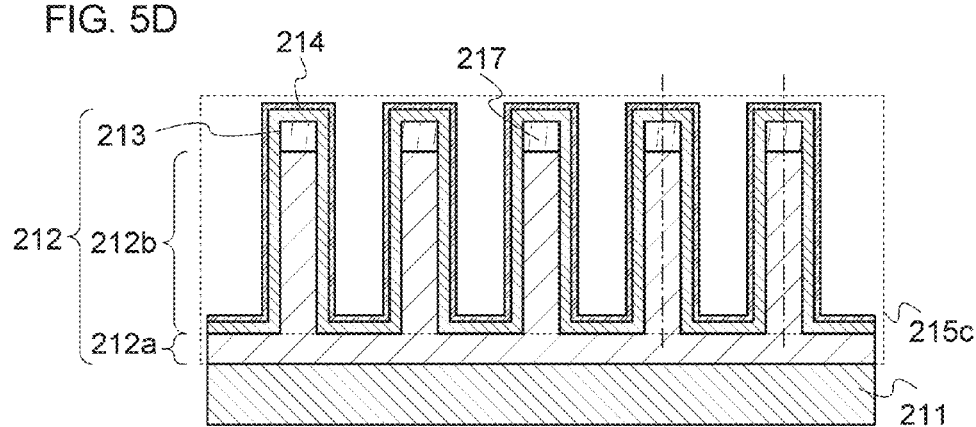

Like the active material layer 215c illustrated in FIG. 5D, a protective layer 217 may be provided between the top of the protrusion 212b and the outer shell 213. A material similar to that for the protective layer 207 described in Embodiment 1 can be used for the protective layer 217 as appropriate. Description is given using the active material 212 in FIG. 5B here, but the protective layer 217 may be provided over the active material in FIG. 5C.

In the negative electrode described in this embodiment, the active material layer can be provided using the current collector 211 as a support. Accordingly, when the current collector 211 has a foil-like shape, a net-like shape, or the like so as to be flexible, a flexible negative electrode can be formed.

A method for forming the negative electrode 216 will be described with reference to FIGS. 6A to 6C. Here, as one mode of the active material layer 215, the active material layer 215a illustrated in FIG. 5B will be described.

Figure 6A:
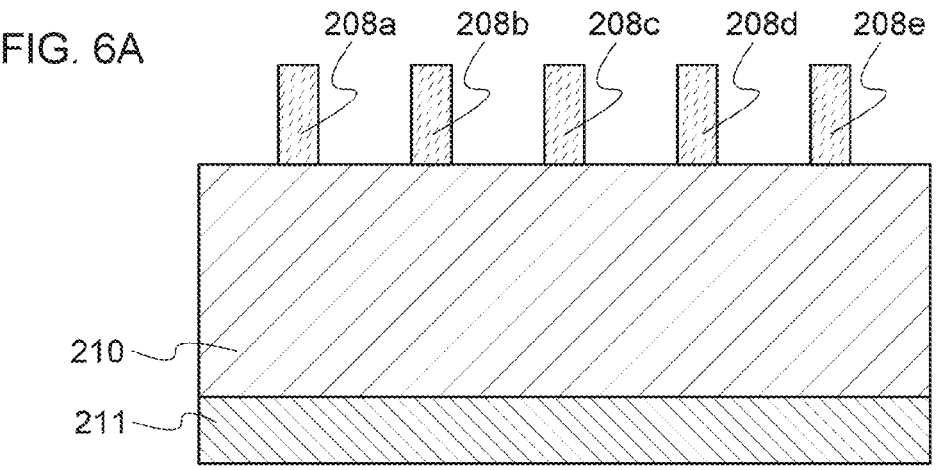
FIGS. 6A to 6C illustrate a method for manufacturing a negative electrode.

As illustrated in FIG. 6A, a silicon layer 210 is formed over the current collector 211. Then, as in Embodiment 1, masks 208a to 208e are formed over the silicon layer 210.

The silicon layer 210 can be formed by a CVD method, a sputtering method, an evaporation method, or the like as appropriate. The silicon layer 210 is formed using single crystal silicon, polycrystalline silicon, or amorphous silicon. The silicon layer 210 may be formed using an n-type silicon layer to which phosphorus is added or a p-type silicon layer to which boron is added.

Figure 6B:
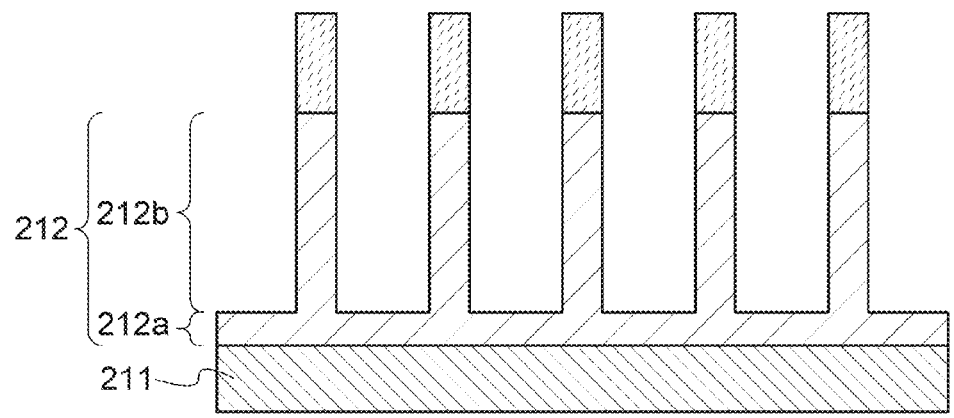
Figure 6C:
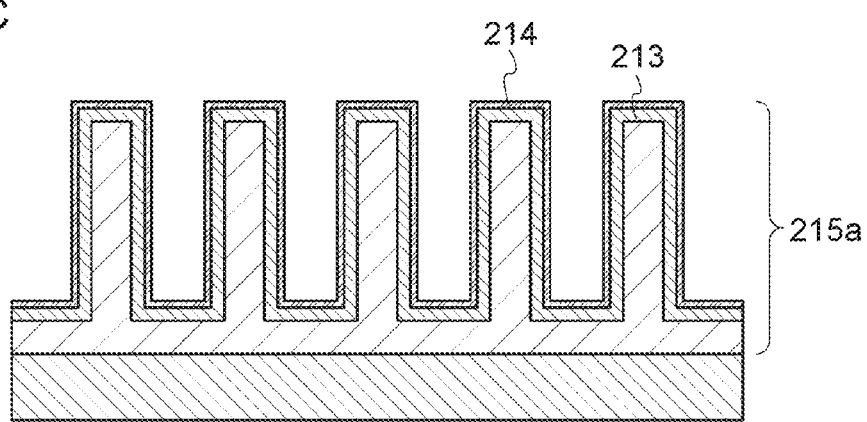

The silicon layer 210 is selectively etched with the use of the masks 208a to 208e, so that the active material 212 including the common portion 212a and the plurality of protrusions 212b is formed as illustrated in FIG. 6B. As a method for etching the silicon layer 210, a dry etching method or a wet etching method can be used as appropriate. Note that when a Bosch process which is a dry etching method is used, a high protrusion can be formed.

After the common portion 212a and the plurality of protrusions 212b are formed, the masks 208a to 208e are removed.

Next, the outer shell 213 is formed over the common portion 212a and the plurality of protrusions 212b. The outer shell 213 can be formed in a manner similar to that of the outer shell 203 described in Embodiment 1.

Then, the graphene 214 is formed over the active material 212, so that the negative electrode 216 in which the active material layer 215a is provided over the current collector 211 can be manufactured.

The graphene 214 can be formed in a manner similar to that of the graphene 204 described in Embodiment 1.

Note that in FIG. 6B, when the common portion 212a is etched to expose part of the current collector 211, the negative electrode including the active material layer 215b illustrated in FIG. 5C can be manufactured.

An insulating layer is formed over the silicon layer 210, the masks 208a to 208e are formed over the insulating layer, and separated protective layers 217 are formed with the use of the masks 208a to 208e. After that, with the use of the masks 208a to 208e and the separated protective layers 217, the silicon layer 210 is selectively etched, whereby the negative electrode including the active material layer 215c illustrated in FIG. 5D can be formed. When the plurality of protrusions 212b are high, that is, the etching time is long, the masks are thinned gradually in the etching step and part of the masks are removed to expose the silicon layer 210. Accordingly, there is variation in height among the protrusions. However, by using the separated protective layers 217 as hard masks, the silicon layer 210 can be prevented from being exposed so that variation in height among the protrusions can be reduced.

Note that also in the negative electrode 216 including any one of the active materials layers 215a to 215c, instead of the graphene 214, a film having higher conductivity than the active material 212, such as a nickel thin film, may be formed over the active material 212 as described in Embodiment 1.

This embodiment can be implemented by being combined with other embodiments as appropriate.

Embodiment 3

In this embodiment, a structure of a power storage device and a method for manufacturing the power storage device will be described.

First, a positive electrode and a formation method thereof will be described.

Figure 7A:
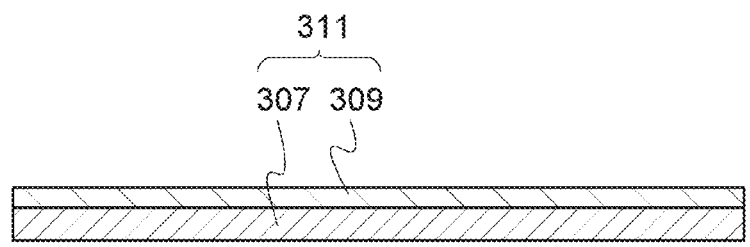
FIGS. 7A to 7C illustrate a positive electrode.

FIG. 7A is a cross-sectional view of a positive electrode 311. In the positive electrode 311, a positive electrode active material layer 309 is formed over a positive electrode current collector 307.

As the positive electrode current collector 307, a material having high conductivity such as platinum, aluminum, copper, titanium, or stainless steel can be used.

The positive electrode current collector 307 can have a foil-like shape, a plate-like shape, a net-like shape, or the like as appropriate.

The positive electrode active material layer 309 can be formed using a lithium compound such as $LiFeO_2$, $LiCoO_2$, $LiNiO_2$, or $LiMn_2O_4$, or $V_2O_5$, $Cr_2O_5$, $MnO_2$, or the like as a material.

Alternatively, an olivine-type lithium-containing composite oxide (a general formula $LiMPO_4$ (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as a general formula $Li_2MSiO_4$ (M is one or more of Fe(II), Mn(II), Co(II), and Ni(II)) may be used. Typical examples of the general formula $Li_2MSiO_4$ which can be used as a material are lithium compounds such as $Li_2FeSiO_4$, $Li_2NiSiO_4$, $Li_2CoSiO_4$, $Li_2MnSiO_4$, $Li_2Fe_aNi_bSiO_4$, $Li_2Fe_aCo_bSiO_4$, $Li_2Fe_kMn_lSiO_4$, $Li_2Ni_kCo_lSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the positive electrode active material layer 309 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Figure 7B:
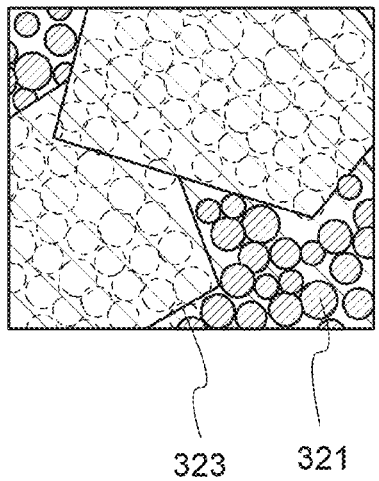

FIG. 7B is a plan view of the positive electrode active material layer 309. The positive electrode active material layer 309 contains positive electrode active materials 321 which are particles capable of occluding and releasing carrier ions, and graphenes 323 which cover a plurality of particles of the positive electrode active materials 321 and at least partly surround the plurality of particles of the positive electrode active materials 321. The different graphenes 323 cover surfaces of the plurality of particles of the positive electrode active materials 321. The positive electrode active materials 321 may partly be exposed. The graphene 204 described in Embodiment 1 can be used as the graphene 323 as appropriate.

The size of the particle of the positive electrode active material 321 is preferably greater than or equal to 20 nm and less than or equal to 100 nm. Note that the size of the particle of the positive electrode active material 321 is preferably smaller because electrons transfer in the positive electrode active materials 321.

Sufficient characteristics can be obtained even when a surface of the positive electrode active material 321 is not covered with a carbon film; however, it is preferable to use both the graphene and the positive electrode active material covered with a carbon film because carriers transfer hopping between the positive electrode active materials and current flows.

Figure 7C:
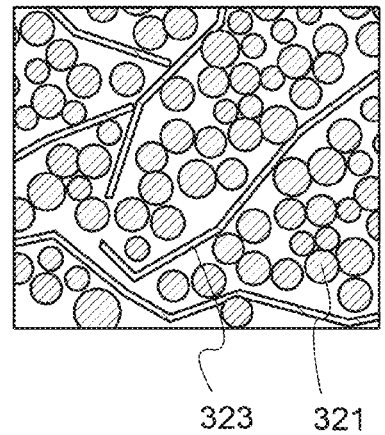

FIG. 7C is a cross-sectional view of part of the positive electrode active material layer 309 in FIG. 7B. The positive electrode active material layer 309 contains the positive electrode active materials 321 and the graphenes 323 which cover the positive electrode materials 321. The graphenes 323 are observed to have linear shapes in cross section. A plurality of particles of the positive electrode active materials are at least partly surrounded with one graphene or plural graphenes. Note that the graphene has a bag-like shape, and the plurality of particles of the positive electrode active materials are at least partly surrounded with the bag-like portion in some cases. In addition, the positive electrode active materials are not covered with the graphenes and partly exposed in some cases.

The desired thickness of the positive electrode active material layer 309 is determined in the range of 20 μm to 100 μm. It is preferable to adjust the thickness of the positive electrode active material layer 309 as appropriate so that a crack and breakup are not caused.

Note that the positive electrode active material layer 309 may contain acetylene black particles having a volume 0.1 times to 10 times as large as that of the graphene, carbon particles having a one-dimensional expansion (e.g., carbon nanofibers), or other known binders.

The positive electrode active material is a material whose volume is expanded by occlusion of carrier ions. When such a material is used, the positive electrode active material layer gets vulnerable and is partly broken by charge and discharge, resulting in lower reliability of a power storage device. However, since the graphene 323 covers the periphery of the positive electrode active material, the graphene prevents dispersion of the positive electrode active material and breakup of the positive electrode active material layer, even when the volume of the positive electrode active material is increased and decreased due to charge and discharge. That is to say, the graphene has a function of maintaining the bond between the positive electrode active materials even when the volume of the positive electrode active materials fluctuates by charge and discharge.

The graphene 323 is in contact with a plurality of particles of the positive electrode active materials and serves also as a conductive additive. Further, the graphene 323 has a function of holding the positive electrode active materials 321 capable of occluding and releasing carrier ions. Thus, a binder does not necessarily have to be mixed into the positive electrode active material layer. Accordingly, the proportion of the positive electrode active materials in the positive electrode active material layer can be increased and the charge/discharge capacity of a power storage device can be increased.

Next, a manufacturing method of the positive electrode active material layer 309 will be described.

Slurry containing particles of positive electrode active materials and graphene oxide is formed. After a positive electrode current collector is coated with the slurry, heating is performed in a reducing atmosphere for reduction treatment so that the positive electrode active materials are baked and part of oxygen is released from the graphene oxide to form openings in graphene, as in the manufacturing method of graphene, which is described in Embodiment 1. Note that oxygen in the graphene oxide is not entirely reduced and partly remains in the graphene. Through the above process, the positive electrode active material layer 309 can be formed over the positive electrode current collector 307. Consequently, the positive electrode active material layer 309 has higher conductivity.

Graphene oxide contains oxygen and thus is negatively charged in a polar solvent. As a result of being negatively charged, graphene oxides disperse. Accordingly, the positive electrode active materials contained in the slurry are not easily aggregated, so that an increase in size of the particle of the positive electrode active material due to baking can be reduced. Thus, the transfer of electrons in the positive electrode active materials is facilitated, so that the conductivity of the positive electrode active material layer can be increased.

Figure 8A:
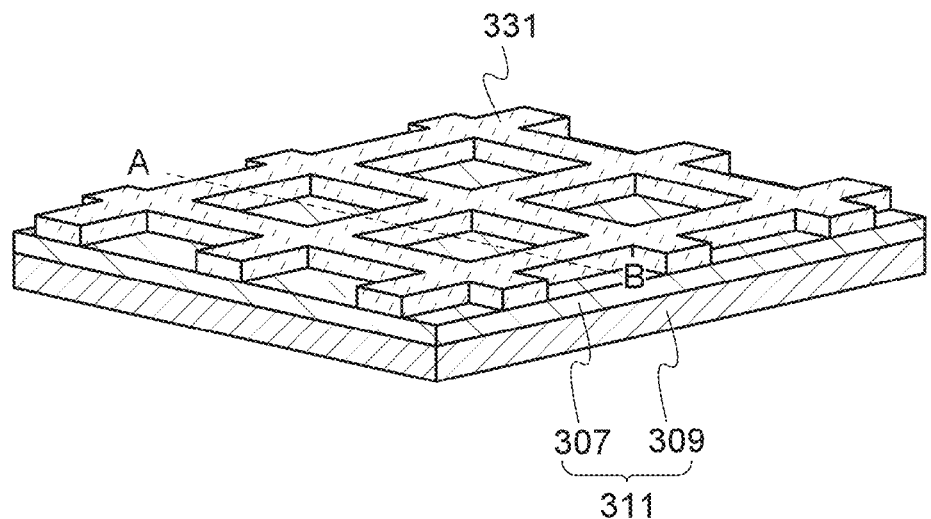
FIGS. 8A and 8B illustrate a positive electrode.
Figure 8B:
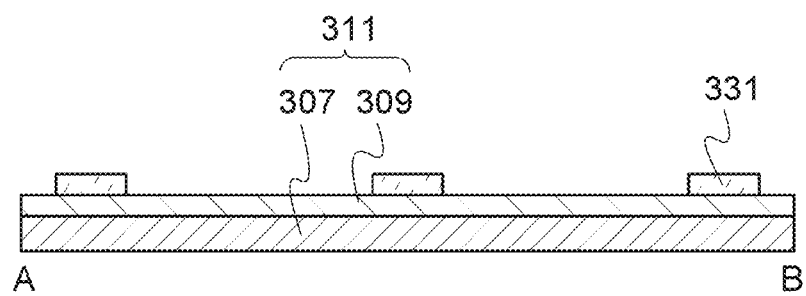

As illustrated in FIGS. 8A and 8B, a spacer 331 may be provided over a surface of the positive electrode 311. FIG. 8A is a perspective view of the positive electrode including the spacer, and FIG. 8B is a cross-sectional view along dashed and dotted line A-B in FIG. 8A.

As illustrated in FIGS. 8A and 8B, in the positive electrode 311, the positive electrode active material layer 309 is provided over the positive electrode current collector 307. The spacer 331 is provided over the positive electrode active material layer 309.

The spacer 331 can be formed using a material which has an insulating property and does not react with an electrolyte. Specifically, an organic material such as an acrylic resin, an epoxy resin, a silicone resin, or polyamide, or low-melting-point glass such as glass paste, glass frit, or glass ribbon can be used. Since the spacer 331 is provided over the positive electrode 311, a separator is not needed in the power storage device completed later. Consequently, the number of components of the power storage device and the cost can be reduced.

The spacer 331 preferably has a planar shape which exposes part of the positive electrode active material layer 309, such as a lattice-like shape or a closed circular or polygonal loop shape. As a result, contact between the positive electrode and the negative electrode can be prevented, and the transfer of carrier ions between the positive electrode and the negative electrode can be promoted.

The thickness of the spacer 331 is preferably greater than or equal to 1 µm and less than or equal to 5 µm, more preferably greater than or equal to 2 µm and less than or equal to 3 µm. As a result, as compared to the case where a separator having a thickness of several tens of micrometers is provided between the positive electrode and the negative electrode as in a conventional power storage device, the distance between the positive electrode and the negative electrode can be reduced, and the distance of movement of carrier ions between the positive electrode and the negative electrode can be short. Accordingly, carrier ions included in the power storage device can be effectively used for charge/discharge.

The spacer 331 can be formed by a printing method, an inkjet method, or the like as appropriate.

Next, a structure of a power storage device and a manufacturing method thereof will be described.

A lithium-ion secondary battery in this embodiment which is a typical example of power storage devices will be described with reference to FIG. 9. Here, description is made below on a cross-sectional structure of the lithium-ion secondary battery.

Figure 9:
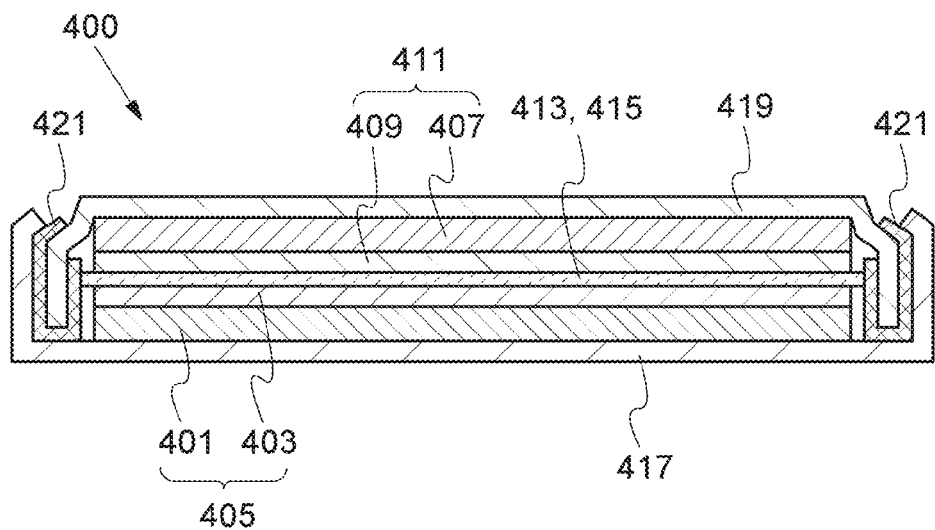
FIG. 9 illustrates a power storage device.

FIG. 9 is a cross-sectional view of the lithium-ion secondary battery.

A lithium-ion secondary battery 400 includes a negative electrode 411 including a negative electrode current collector 407 and a negative electrode active material layer 409, a positive electrode 405 including a positive electrode current collector 401 and a positive electrode active material layer 403, and a separator 413 provided between the negative electrode 411 and the positive electrode 405. Note that the separator 413 includes an electrolyte 415. The negative electrode current collector 407 is connected to an external terminal 419 and the positive electrode current collector 401 is connected to an external terminal 417. An end portion of the external terminal 419 is embedded in a gasket 421. In other words, the external terminals 417 and 419 are insulated from each other with the gasket 421.

The negative electrode 206 described in Embodiment 1 or the negative electrode 216 described in Embodiment 2 can be used as appropriate as the negative electrode 411.

As the positive electrode current collector 401 and the positive electrode active material layer 403, the positive electrode current collector 307 and the positive electrode active material layer 309 which are described in this embodiment can be used as appropriate.

An insulating porous material is used for the separator 413. As a typical example of the separator 413, for example, paper; nonwoven fabric; a glass fiber; ceramics; a synthetic fiber containing nylon (polyamide), vinylon (polyvinyl alcohol based fiber), polyester, acrylic, polyolefin, or polyurethane; or the like may be used. However, a material which does not dissolve in the electrolyte 415 should be selected.

When a positive electrode including a spacer over a positive electrode active material layer as illustrated in FIGS. 8A and 8B is used as the positive electrode 405, the separator 413 is not necessarily provided.

As a solute of the electrolyte 415, a material including carrier ions is used. Typical examples of the solute of the electrolyte include lithium salt such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salt, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which carrier ions can transfer is used. As the solvent of the electrolyte 415, an aprotic organic solvent is preferably used. Typical examples of an aprotic organic solvent include ethylene carbonate, propylene carbonate, dimethyl carbonate, diethyl carbonate, γ-butyrolactonectone, acetonitrile, dimethoxyethane, tetrahydrofuran, and the like, and one or more of them can be used. When a gelled polymer material is used as the solvent of the electrolyte 415, safety against liquid leakage or the like is increased. Further, the lithium-ion secondary battery 400 can be made thinner and more lightweight. Typical examples of a gelled polymer material include a silicon gel, an acrylic gel, an acrylonitrile gel, polyethylene oxide, polypropylene oxide, a fluorine-based polymer, and the like. In addition, by using one or plural kinds of ionic liquid (room-temperature molten salt) which has features of non-flammability and non-volatility as a solvent of the electrolyte 415, short-circuit inside the power storage device can be prevented, and moreover, even when the internal temperature is increased due to overcharge or the like, explosion, ignition, or the like of the power storage device can be prevented.

As the electrolyte 415, a solid electrolyte such as $Li_3PO_4$ can be used. As other examples of a solid electrolyte, $Li_xPO_yN_z$ (x, y, and z are positive real numbers) obtained by adding nitrogen to $Li_3PO_4$, $Li_2S$—$SiS_2$, $Li_2S$—$P_2S_5$, $Li_2S$—$B_2S_3$, and the like are given. In addition, a solid electrolyte obtained by doping any of the above solid electrolytes with LiI or the like can also be used. Note that in the case of using the solid electrolyte as the electrolyte 415, the separator 413 is not needed.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

Next, a method for manufacturing the lithium-ion secondary battery 400 according to this embodiment will be described.

By the manufacturing method described in any of Embodiment 1, Embodiment 2, and this embodiment, the positive electrode 405 and the negative electrode 411 are formed as appropriate.

Next, the positive electrode 405, the separator 413, and the negative electrode 411, are impregnated with the electrolyte 415. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium-ion secondary battery can be fabricated.

Note that a spacer and a washer may be provided between the external terminal 417 and the positive electrode 405 or between the external terminal 419 and the negative electrode 411 so that connection between the external terminal 417 and the positive electrode 405 or between the external terminal 419 and the negative electrode 411 is enhanced.

This embodiment can be implemented by being combined with other embodiments as appropriate.

Embodiment 4

A power storage device according to an embodiment of the present invention can be used as a power supply of various electric devices which are driven by electric power.

Specific examples of electric devices using the power storage device according to an embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, cameras such as video cameras and digital still cameras, high-frequency heating apparatuses such as microwaves, electric rice cookers, electric washing machines, air-conditioning systems such as air conditioners, electric refrigerators, electric freezers, electric refrigerator-freezers, freezers for preserving DNA, dialysis devices, and the like. In addition, moving objects driven by an electric motor using power from a power storage device are also included in the category of electric devices. As examples of the moving objects, electric vehicles, hybrid vehicles which include both an internal-combustion engine and an electric motor, motorized bicycles including motor-assisted bicycles, and the like can be given.

In the electric devices, the power storage device according to an embodiment of the present invention can be used as a power storage device for supplying enough power for almost the whole power consumption (such a power storage device is referred to as a main power supply). Alternatively, in the electric devices, the power storage device according to an embodiment of the present invention can be used as a power storage device which can supply power to the electric devices when the supply of power from the main power supply or a commercial power supply is stopped (such a power storage device is referred to as an uninterruptible power supply). Further alternatively, in the electric devices, the power storage device according to an embodiment of the present invention can be used as a power storage device for supplying power to the electric devices at the same time as the power supply from the main power supply or a commercial power supply (such a power storage device is referred to as an auxiliary power supply).

Figure 10:
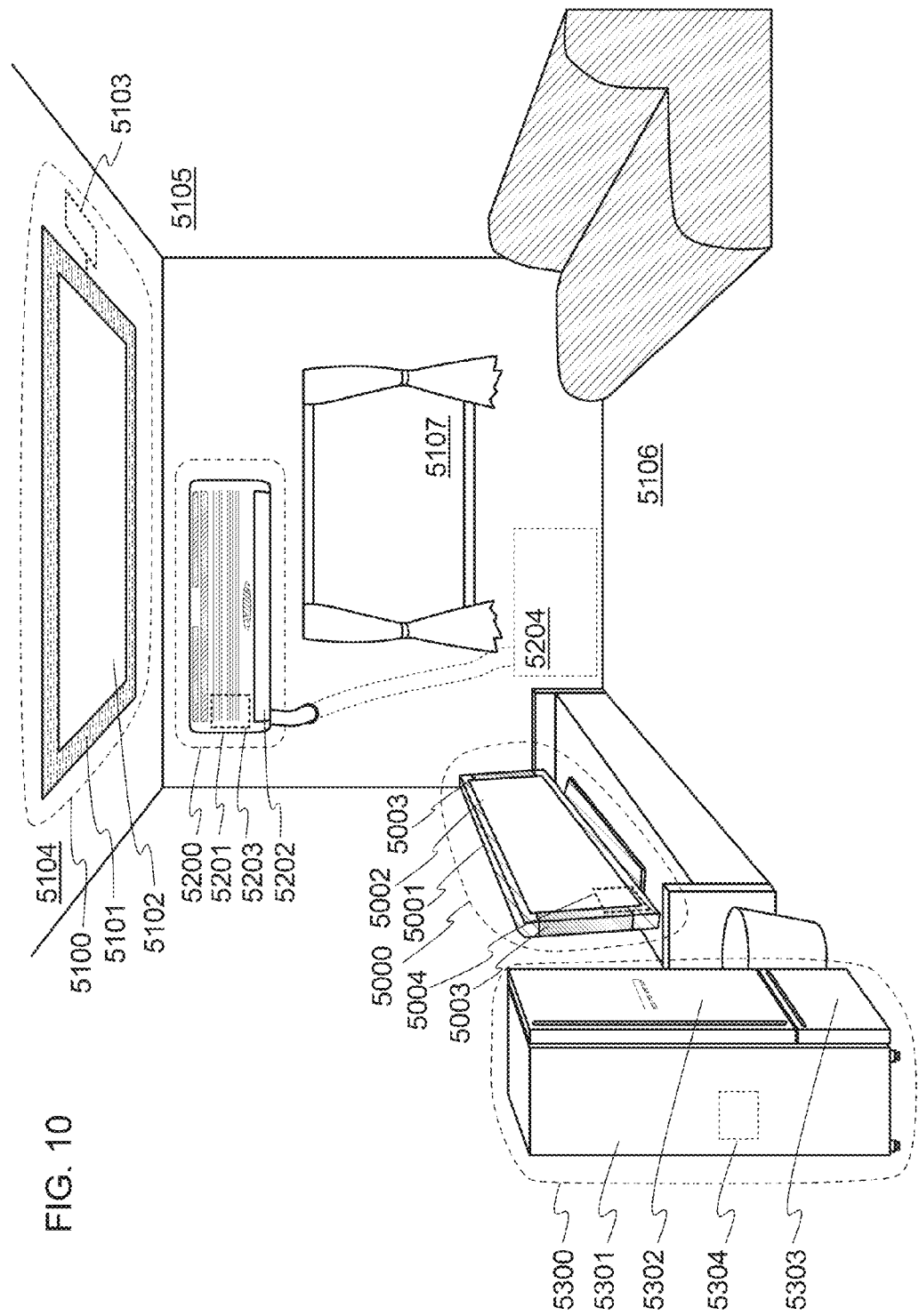
FIG. 10 illustrates electronic devices.

FIG. 10 illustrates specific structures of the electric devices. In FIG. 10, a display device 5000 is an example of an electric device including a power storage device 5004. Specifically, the display device 5000 corresponds to a display device for TV broadcast reception and includes a housing 5001, a display portion 5002, speaker portions 5003, the power storage device 5004, and the like. The power storage device 5004 is provided in the housing 5001. The power storage device according to an embodiment of the present invention is used as the power storage device 5004. The display device 5000 can receive power from a commercial power supply. Alternatively, the display device 5000 can use power stored in the power storage device 5004. Thus, the display device 5000 can be operated with the use of the power storage device 5004 as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 10, an installation lighting device 5100 is an example of an electric device including a power storage device 5103. Specifically, the lighting device 5100 includes a housing 5101, a light source 5102, the power storage device 5103, and the like. The power storage device according to an embodiment of the present invention is used as the power storage device 5103. FIG. 10 shows the case where the power storage device 5103 is provided in a ceiling 5104 on which the housing 5101 and the light source 5102 are installed; alternatively, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with use of the power storage device 5103 as an uninterruptible power supply even when power cannot be supplied from a commercial power supply due to power failure or the like.

Although the installation lighting device 5100 provided on the ceiling 5104 is illustrated in FIG. 10 as an example, the power storage device according to an embodiment of the present invention can also be used for an installation lighting device provided for, for example, a wall 5105, a floor 5106, a window 5107, or the like other than the ceiling 5104. Further, the power storage device can also be used for a tabletop lighting device or the like.

As the light source 5102, an artificial light source which provides light artificially by using power can be used. Specifically, an incandescent lamp, a discharge lamp such as a fluorescent lamp, and a light-emitting element such as an LED or an organic EL element are given as examples of the artificial light source.

In FIG. 10, an air conditioner including an indoor unit 5200 and an outdoor unit 5204 is an example of an electric device including a power storage device 5203. Specifically, the indoor unit 5200 includes a housing 5201, a ventilation duct 5202, the power storage device 5203, and the like. The power storage device according to an embodiment of the present invention is used as the power storage device 5203. Although FIG. 10 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Specifically, in the case where the power storage devices 5203 are provided in both the indoor unit 5200 and the outdoor unit 5204, the air conditioner can be operated with use of the power storage device 5203 as an uninterruptible power supply even when power cannot be supplied from a commercial power supply because of power failure or the like.

Note that although the separated air conditioner including the indoor unit and the outdoor unit is illustrated in FIG. 10 as an example, the power storage device according to an embodiment of the present invention can be used in an air conditioner in which the functions of an indoor unit and an outdoor unit are integrated in one housing.

In FIG. 10, an electric refrigerator-freezer 5300 is an example of an electric device including a power storage device 5304 according to an embodiment of the present invention. Specifically, the electric refrigerator-freezer 5300 includes a housing 5301, a door for a refrigerator 5302, a door for a freezer 5303, the power storage device 5304, and the like. In FIG. 10, the power storage device according to an embodiment of the present invention is used as the power storage device 5304, and the power storage device 5304 is provided in the housing 5301. The electric refrigerator-freezer 5300 can receive power from a commercial power supply or can use power stored in the power storage device 5304. Thus, the electric refrigerator-freezer 5300 can be operated with the use of the power storage device 5304 as an uninterruptible power supply even when power cannot be supplied from a commercial power supply because of power failure or the like.

Note that among the electric devices described above, a high-frequency heating apparatus such as a microwave and an electric device such as an electric rice cooker require high power in a short time. The tripping of a circuit breaker of a commercial power supply in use of electric devices can be prevented by using the power storage device according to an embodiment of the present invention as an auxiliary power supply for supplying power which cannot be supplied enough by a commercial power supply.

In addition, in a time period when electric devices are not used, specifically when the proportion of the amount of power which is actually used to the total amount of power which can be supplied by a commercial power supply (such a proportion is referred to as usage rate of power) is low, power can be stored in the power storage device, whereby the usage rate of power can be reduced in a time period when the electric devices are used. In the case of the electric refrigerator-freezer 5300, power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of power in daytime can be reduced.

A portable information terminal including the power storage device according to an embodiment of the present invention will be described with reference to FIGS. 11A to 11C.

FIGS. 11A and 11B illustrate a tablet terminal that can be folded. FIG. 11A illustrates the tablet terminal which is open (unfolded). The tablet terminal includes a housing 9630, a display portion 9631*a*, a display portion 9631*b*, a switch 9034 for switching display modes, a power switch 9035, a switch 9036 for switching to power-saving mode, a fastener 9033, and an operation switch 9038.

A touch screen area 9632*a* can be provided in part of the display portion 9631*a*, where data can be input by touching displayed operation keys 9638. Note that half of the display portion 9631*a* has only a display function and the other half has a touch screen function, but the present invention is not limited to this structure. All the area of the display portion 9631*a* may have a touch screen function. For example, a keyboard can be displayed on the whole display portion 9631*a* to be used as a touch screen, and the display portion 9631*b* can be used as a display screen.

A touch screen area 9632*b* can be provided in part of the display portion 9631*b* as in the display portion 9631*a*. When a switching button 9639 for showing/hiding a keyboard which is displayed on the touch screen is touched with a finger, a stylus, or the like, a keyboard button can be displayed on the display portion 9631*b*.

Touch input can be performed in the touch screen area 9632*a* and the touch screen area 9632*b* at the same time.

The switch 9034 for switching display modes can switch the display between portrait mode, landscape mode, and the like, and between monochrome display and color display, for example. The switch 9036 for switching to power-saving mode allows optimizing the display luminance in accordance with the amount of external light in use which is detected by an optical sensor incorporated in the tablet terminal. In addition to the optical sensor, other detecting devices such as sensors for detecting inclination, like a gyroscope or an acceleration sensor, may be incorporated in the tablet terminal.

Although the display portion 9631*a* and the display portion 9631*b* have the same display area in FIG. 11A, an embodiment of the present invention is not limited to this example. The display portion 9631*a* and the display portion 9631*b* may have different areas or different display quality. For example, higher definition images may be displayed on one of the display portions 9631*a* and 9631*b*.

FIG. 11B illustrates the tablet terminal closed (folded), which includes the housing 9630, a solar cell 9633, a charge/discharge control circuit 9634, a battery 9635, and a DCDC converter 9636. In FIG. 11B, a structure including the battery 9635 and the DCDC converter 9636 is illustrated as an example of the charge/discharge control circuit 9634. The power storage device described in any of the above embodiments is used as the battery 9635.

Since the tablet terminal can be folded, the housing 9630 can be closed when not in use. Thus, the display portions 9631*a* and 9631*b* can be protected, which makes it possible to provide a tablet terminal with high durability and improved reliability for long-term use.

The tablet terminal illustrated in FIGS. 11A and 11B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies power to a touch screen, a display portion, an image signal processor, and the like. Note that a structure in which the solar cell 9633 is provided on one or both surfaces of the housing 9630 is preferable because the battery 9635 can be charged efficiently. The use of the power storage device according to an embodiment of the present invention as the battery 9635 brings an advantage such as a reduction in size.

The structure and the operation of the charge/discharge control circuit 9634 illustrated in FIG. 11B are described with reference to a block diagram of FIG. 11C. The solar cell 9633, the battery 9635, the DCDC converter 9636, a converter 9637, switches SW1 to SW3, and the display portion 9631 are illustrated in FIG. 11C, and the battery 9635, the DCDC converter 9636, the converter 9637, and the switches SW1 to SW3 correspond to the charge/discharge control circuit 9634 illustrated in FIG. 11B.

First, an example of operation in the case where power is generated by the solar cell 9633 using external light is described. The voltage of power generated by the solar cell is raised or lowered by the converter 9636 so that the power has a voltage for charging the battery 9635. When the power from the solar cell 9633 is used for operation of the display portion 9631, the switch SW1 is turned on and the voltage of the power is raised or lowered by the converter 9637 to be the voltage needed for the display portion 9631. In addition, when display on the display portion 9631 is not performed, the switch SW1 is turned off and the switch SW2 is turned on so that charge of the battery 9635 may be performed.

Although the solar cell 9633 is shown as an example of a power generation means, there is no particular limitation on the power generation means and the battery 9635 may be charged with another means such as a piezoelectric element or a thermoelectric conversion element (Peltier element). For example, the battery 9635 may be charged with a non-contact power transmission module which is capable of charging by transmitting and receiving power by wireless (without contact), or another charge means used in combination.

The present invention is not limited to the electric device illustrated in FIGS. 11A to 11C as long as the power storage device described in any of the above embodiments is included.

This embodiment can be implemented by being combined with other embodiments as appropriate.

This application is based on Japanese Patent Application Serial No. 2011-203688 filed with Japan Patent Office on Sep. 16, 2011, the entire contents of which are hereby incorporated by reference.

What is claimed is:

1. A power storage device comprising a negative electrode, the negative electrode comprising:
   a common portion;
   a plurality of protrusions protruding from the common portion;
   an outer shell in contact with and attached to surfaces of the common portion and the plurality of protrusions; and
   graphene in contact with and attached to a surface of the outer shell,
   wherein axes of the plurality of protrusions are oriented in a same direction.

2. The power storage device according to claim 1, wherein the common portion, the plurality of protrusions, and the outer shell each comprise silicon.

3. The power storage device according to claim 1, wherein the common portion and the plurality of protrusions each have any one of a single crystal structure, a polycrystalline structure, and a microcrystalline structure, and wherein the outer shell has an amorphous structure.

4. The power storage device according to claim 1, wherein the plurality of protrusions each have a columnar shape, a conical or pyramidal shape, a plate-like shape, or a pipe-like shape.

5. The power storage device according to claim 1, further comprising a protective layer comprising at least one of a conductive layer, a semiconductor layer, and an insulating layer between a top of each of the plurality of protrusions and the outer shell.

6. A power storage device comprising a negative electrode, the negative electrode comprising:
   a current collector;
   a common portion over the current collector;
   a plurality of protrusions protruding from the common portion;
   an outer shell in contact with and attached to surfaces of the common portion and the plurality of protrusions; and
   graphene in contact with and attached to a surface of the outer shell,
   wherein axes of the plurality of protrusions are oriented in a same direction.

7. The power storage device according to claim 6, wherein the common portion, the plurality of protrusions, and the outer shell each comprise silicon.

8. The power storage device according to claim 6, wherein the common portion and the plurality of protrusions each have any one of a single crystal structure, a polycrystalline structure, and a microcrystalline structure, and wherein the outer shell has an amorphous structure.

9. The power storage device according to claim 6, wherein the plurality of protrusions each have a columnar shape, a conical or pyramidal shape, a plate-like shape, or a pipe-like shape.

10. The power storage device according to claim 6, further comprising a protective layer comprising at least one of a conductive layer, a semiconductor layer, and an insulating layer between a top of each of the plurality of protrusions and the outer shell.

11. A power storage device comprising a negative electrode, the negative electrode comprising:
    a current collector;
    a plurality of protrusions over the current collector;
    an outer shell in contact with and attached to surfaces of the current collector and the plurality of protrusions; and
    graphene in contact with and attached to a surface of the outer shell,
    wherein axes of the plurality of protrusions are oriented in a same direction.

12. The power storage device according to claim 11, wherein the plurality of protrusions and the outer shell each comprise silicon.

13. The power storage device according to claim 11, wherein the plurality of protrusions have any one of a single crystal structure, a polycrystalline structure, and a microcrystalline structure, and wherein the outer shell has an amorphous structure.

14. The power storage device according to claim 11, wherein the plurality of protrusions each have a columnar shape, a conical or pyramidal shape, a plate-like shape, or a pipe-like shape.

15. The power storage device according to claim 11, further comprising a protective layer comprising at least one of a conductive layer, a semiconductor layer, and an insulating layer between a top of each of the plurality of protrusions and the outer shell.

* * * * *